United States Patent
Isoda et al.

(10) Patent No.: US 11,650,988 B2
(45) Date of Patent: May 16, 2023

(54) DATABASE MANAGEMENT SYSTEM AND DATABASE PROCESSING METHOD

(71) Applicants: Hitachi, Ltd., Tokyo (JP); The University of Tokyo, Tokyo (JP)

(72) Inventors: Yuya Isoda, Tokyo (JP); Kazuhiko Mogi, Tokyo (JP); Norifuml Nishikawa, Tokyo (JP); Kazuo Goda, Tokyo (JP); Yuto Hayamizu, Tokyo (JP); Masaru Kitsuregawa, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 359 days.

(21) Appl. No.: 17/029,354

(22) Filed: Sep. 23, 2020

(65) Prior Publication Data
US 2021/0097203 A1   Apr. 1, 2021

(30) Foreign Application Priority Data
Oct. 1, 2019   (JP) .............................. JP2019-181186

(51) Int. Cl.
*G06F 16/24* (2019.01)
*G06F 16/2455* (2019.01)
(Continued)

(52) U.S. Cl.
CPC .... *G06F 16/24556* (2019.01); *G06F 16/2246* (2019.01); *G06F 16/24545* (2019.01)

(58) Field of Classification Search
CPC ........... G06F 16/24556; G06F 16/2246; G06F 16/24545
See application file for complete search history.

(56) References Cited

U.S. PATENT DOCUMENTS

2013/0138698 A1* 5/2013 Harada ............... G06F 21/6254
707/797
2013/0291128 A1* 10/2013 Ito ....................... G06F 21/6254
726/30
(Continued)

OTHER PUBLICATIONS

Kristen LeFevre et al., "Incognito: Efficient Full-Domain K-Anonymity", SIGMOD 2005, p. 49-60, Jun. 14-16, 2005.

*Primary Examiner* — Merilyn P Nguyen
(74) *Attorney, Agent, or Firm* — Mattingly & Malur, PC

(57) ABSTRACT

The database management system (DBMS) receives a first instruction specifying anonymization rule information corresponding to a column of the relation table, among anonymization rule information that is present for each column included in the relation table and shows a plurality of generalization rules. The DBMS reads the column from the relation table in response to the first instruction, and generates a temporary result obtained by generalizing each attribute value of the column based on any of a plurality of generalization rules. The DBMS generates an aggregate result obtained by aggregating the temporary result. The DBMS generates an anonymization method including generalization information indicating a correspondence relationship of each attribute value of the column and any of the plurality of generalization rules when the aggregate result satisfies a disclosure rule. The DBMS generates anonymization information as a result of processing the relation table based on the first anonymization method.

15 Claims, 24 Drawing Sheets

(51) Int. Cl.
*G06F 16/22* (2019.01)
*G06F 16/2453* (2019.01)

(56) References Cited

U.S. PATENT DOCUMENTS

| | | | | |
|---|---|---|---|---|
| 2014/0380498 | A1* | 12/2014 | Toyoda | G06F 21/62 |
| | | | | 726/27 |
| 2015/0007249 | A1 | 1/2015 | Bezzi et al. | |
| 2015/0169895 | A1* | 6/2015 | Gkoulalas-Divanis | G06F 21/6227 |
| | | | | 726/26 |
| 2015/0269383 | A1* | 9/2015 | Lang | G06F 21/57 |
| | | | | 726/1 |
| 2016/0342637 | A1* | 11/2016 | Braghin | G06F 9/5005 |
| 2017/0068828 | A1* | 3/2017 | Nishi | G06F 16/35 |
| 2018/0218426 | A1* | 8/2018 | Vaya | G06F 16/9577 |
| 2018/0232488 | A1* | 8/2018 | Jafer | G06F 21/6254 |
| 2019/0156061 | A1* | 5/2019 | Chakraborty | H04L 63/0421 |

\* cited by examiner

FIG. 5

RELATIONSHIP TABLE HISTORY 212

| RELATION TABLE ID (501) | INSERTION DATE AND TIME (502) | DELETION DATE AND TIME (UPDATE, DELETE) (503) | REFERENCE AUTHORITY (504) | OUTPUT AUTHORITY (505) |
|---|---|---|---|---|
| t1 | 2019/1/25 | 2019/1/25 | ALL | ALL |
| t2 | 2019/1/28 | 2019/1/24 | ALL | - |
| t3 | 2019/1/27 | 2019/1/29 | ALL | C1, C2 |

ANONYMIZATION METHOD HISTORY 213

| ANONYMIZATION METHOD ID (511) | RELATION TABLE ID (512) | GENERATION DATE AND TIME (513) | APPLICATION INFORMATION (514) |
|---|---|---|---|
| m1 | t1 | 2019/1/26 | 1 |
| m2 | t2 | 2019/1/27 | 1 |
| m3 | t3 | 2019/1/28 | 0 |

FIG. 11
DISCLOSURE RULE
152

| AUTHORIZATION RECIPIENT | #1 | #2 | #3 |
|---|---|---|---|
| OBJECT NAME | admin | USER01 | USER02 |
| SELECT | ALL TABLES | ALL TABLES | ALL TABLES |
| OUTPUT TABLE | yes | yes | yes |
| K-ANONYMITY | 100, off (ALL OUTPUT) | 90, off (RANDOM OUTPUT) | 0, off (PROHIBIT OUTPUT) |
| L-DIVERSITY | 0 | 3 | 10 |
| CHECK ANONYMIZATION | 0 | 3 | 10 |
| CREATE STATIC VIEW | yes | yes | yes |
| IMPORT ANONYMIZATION | yes | yes | yes |
| EXPORT ANONYMIZATION | yes | yes | no |
| OUTPUT ANONYMIZATION | yes | yes | no |
| | Query, RcAnonyTables (All), AnonyTables | Query, RcAnonyTables (Count), AnonyTables | Query, AnonyTables |
| | Query, RcAnonyTables (-|Count|Statistics|All), AnonyTables | | |

FIG. 15

```
CREATE STATIC VIEW medic1 (age) AS                          ~1501
SELECT       age          ~1511
FROM         patient_table ~1512
ANONYMIZE    GLOBAL-NODE-RECODING Gen_age ON age = Gen_age.Level0   ~1513
K-ANONYMITY  age ~1514
...
```

```
> SUCCESS: Adding the following (A query changed into a anonymization one)    ~1502S
CREATE VIEW medic1 (age) AS
SELECT    Anony_age.After AS age
FROM      patient_table JOIN Anony_age ON patient_table.age = Anony_age.Before
...
```

```
> FAILURE:  A query couldn't change into a anonymization one.                  ~1502F
            You should check a query or user's rule of disclosure.
```

FIG. 21

```
SELECT      age, sex, ICD10, weight     ~2111
FROM        patient_table      ~2112
ANONYMIZE   GLOBAL-NODE-RECODING Gen_age ON age = Gen_age.Level0 AND     ~2113
            GLOBAL-NODE-RECODING Gen_sex ON sex = Gen_sex.Level0 AND
            GLOBAL-NODE-RECODING Gen_ICD10 ON ICD10 = Gen_ICD10.Level0 AND
            GLOBAL-NODE-RECODING Gen_weight ON weight = Gen_weight.Level0
K-ANONYMITY age, sex, ICD10, weight    ~2114
..
```
~2101

```
SELECT   Anony_age.After AS age, Anony_sex.After AS sex, Anony_ICD10.After AS ICD10,
         Anony_weight.After AS weight
FROM     patient_table
         JOIN Anony_age ON patient_table.age = Anony_age.Before
         JOIN Anony_sex ON patient_table.ICD10 = Anony_age.Before
         JOIN Anony_ICD10 ON patient_table.ICD10 = Anony_age.Before
         JOIN Anony_weight ON patient_table.weight = Anony_age.weight
..
```
~201Y

DATABASE MANAGEMENT SYSTEM AND DATABASE PROCESSING METHOD

CROSS-REFERENCE TO RELATED APPLICATION

The present application claims priority from Japanese application JP 2019-181186, filed on Oct. 1, 2019, the contents of which is hereby incorporated by reference into this application.

BACKGROUND OF THE INVENTION

1. Field of the Invention

The present invention relates generally to data processing and, for example, to database management.

2. Description of the Related Art

Examples of a database in which relation tables are stored include a database of medical information (for example, electronic medical record). Improvement in medical technology achieved by utilizing such medical information is expected.

However, the medical information includes privacy information. Therefore, it is considered to apply an anonymization technique when the medical information is utilized.

The anonymization techniques for a database include techniques disclosed in US2015/0007249 (PTL 1) and Kristen LeFevre, David J. DeWitt, and Raghu Ramakrishnan, "Incognito: Efficient Full-Domain K-Anonymity", SIGMOD 2005, p 49-60, Jun. 14-16, 2005 (Non-PTL 1).

By applying the anonymization technique, privacy information (an example of information to be anonymized) in the database can be anonymized in a manner of satisfying disclosure rules (typically, conditions such as values of k and values of l).

It is desired that anonymization processing is fast. However, neither PTL 1 nor Non-PTL 1 discloses or suggests a technique for performing the anonymization processing at a high speed.

SUMMARY OF THE INVENTION

The database management system receives a first instruction specifying first anonymization rule information corresponding to a first column of the relation table, among anonymization rule information that is present for each column included in the relation table and shows a plurality of generalization rules. The database management system reads a first column from the relation table in response to the first instruction, and generates a first temporary result obtained by generalizing each attribute value of the first column based on any of a plurality of generalization rules indicated in the first anonymization rule information. The database management system generates a first aggregate result obtained by aggregating the first temporary result. The database management system generates a first anonymization method including generalization information indicating a correspondence relationship of each attribute value of the first column and any of the plurality of generalization rules indicated in the first anonymization rule information when the first aggregate result satisfies a disclosure rule indicated by disclosure rule information. The database management system generates first anonymization information as a result of processing the relation table based on the first anonymization method in response to the first instruction or a second instruction, and responds a first anonymization result that is all or a part of the first anonymization information.

An anonymization method can be generated by reading only a first column in a relation table, and an anonymization result can be generated by processing the relation table based on the anonymization method. Therefore, the anonymization processing can be performed at a high speed.

BRIEF DESCRIPTION OF THE DRAWINGS

FIG. 5 is a diagram showing a configuration example of a relation table history and an anonymization method history.

FIG. 11 is a diagram showing an example of a disclosure rule.

FIG. 15 is a diagram showing an example of a generation and response instruction of the anonymization method and a response to the instruction.

FIG. 21 is a diagram showing an example of the instruction for the anonymization processing and an example of the anonymization query for the anonymization processing.

DESCRIPTION OF THE PREFERRED EMBODIMENTS

Figure 1:
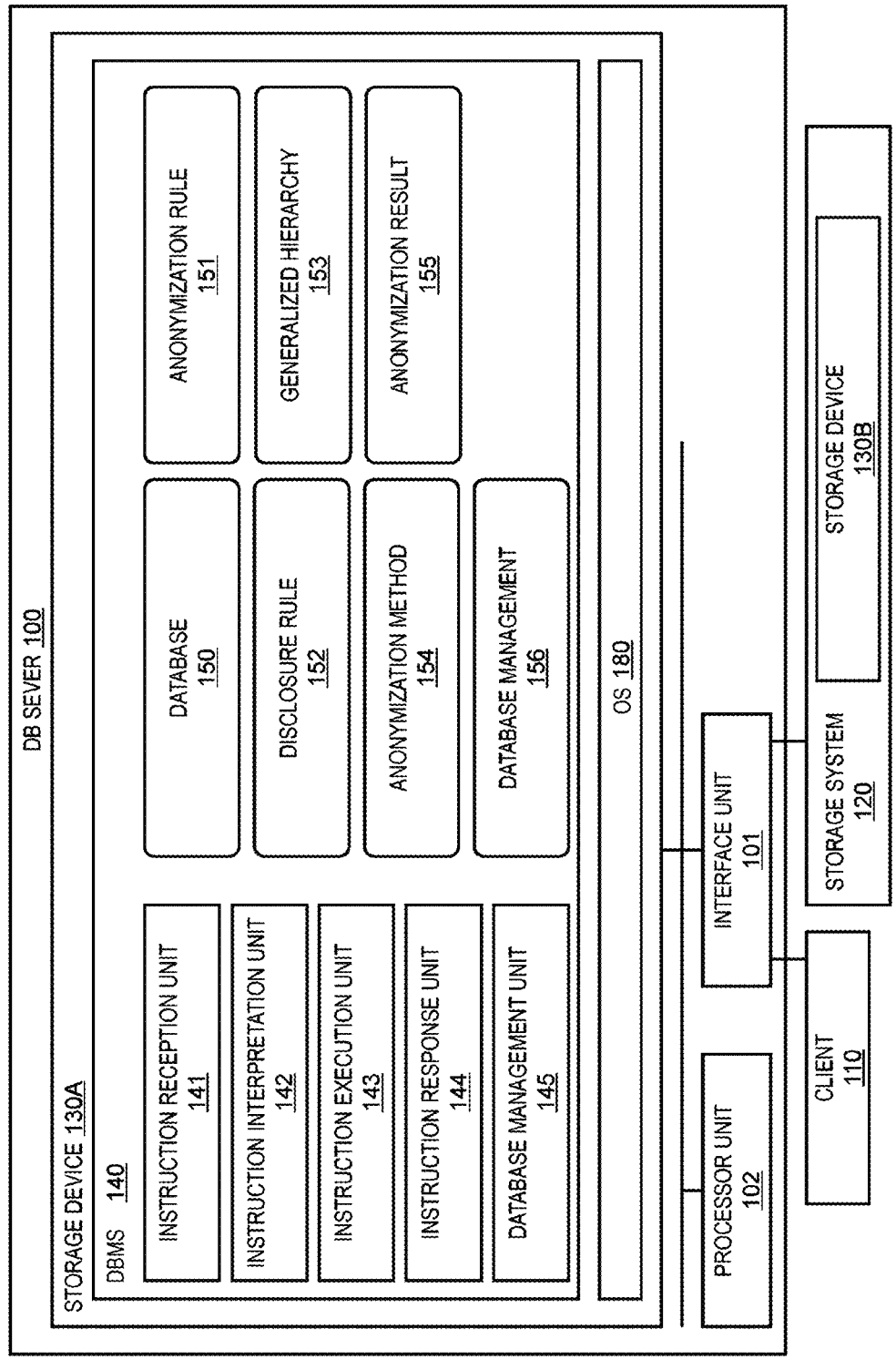
FIG. 1 is a diagram showing a configuration example of an entire system including a DB server that executes a DBMS according to an embodiment of the invention.

In the following description, a database management system is referred to as a "DBMS", and a server including the DBMS is referred to as a "DB server". An issuer of a query to the DBMS may be a computer program (for example, an application program) external to the DBMS. The external computer program may be a program executed in the DB server, or may be a program executed by a device (for example, a client) connected to the DB server.

In the following description, an "interface unit" is one or more interfaces. The one or more interfaces may be one or more interface devices (for example, one or more network interface cards (NICs)) of the same type, or may be two or more interface devices (for example, a NIC and a host bus adapter (HBA)) of different types.

In the following description, a "storage device unit" is one or more storage devices. The storage device may be a volatile memory (for example, a main storage memory), a nonvolatile memory (for example, a flash memory or a solid state drive (SSD) including the same), or a disk device (for example, a hard disk drive (HDD)). In the storage device unit, all storage devices of a same type may be present, or a mixture of storage devices of different types may be present.

In the following description, a "processor unit" is at least one processor. The at least one processor is typically a central processing unit (CPU). The processor may include a hardware circuit that executes a part or all of processing.

In the following description, although a function may be described in an expression of "kkk unit", the function may be achieved by one or more computer programs being executed by the processor unit, and may be achieved by one or more hardware circuits (for example, a field-programmable gate array (FPGA) or an application specific integrated circuit (ASIC)). When the function is achieved by the program being executed by the processor unit, the function may be at least a part of the processor unit, since defined processing is performed using the storage device unit and/or the interface unit as appropriate. The processing described with the function as a subject may be processing performed by a processor unit or a device including the processor unit. The program may be installed from a program source. The program source may be, for example, a program distribution computer or a computer-readable recording medium (for example, a non-transitory recording medium). The description of each function is an example, and a plurality of functions may be combined into one function, or one function may be divided into a plurality of functions.

In the following description, a common part in reference numerals may be used when elements of the same type are described without distinction, and a reference numeral may be used when the elements of the same type are distinguished. For example, when storage devices are not distinguished, the storage device is referred to as a "storage device 130", and when the storage devices are distinguished, the storage devices are referred to as a "storage device 130A" and a "storage device 130B".

In the following description, for each column included in a relation table included in a database, an "attribute item" means a label (for example, a column name) of the column, and an "attribute value" means a value of the attribute item of the column. For each column, one attribute item and one or more attribute values are present.

Hereinafter, one embodiment of the invention will be described with reference to drawings. The invention is not limited by the following description.

Figure 2:
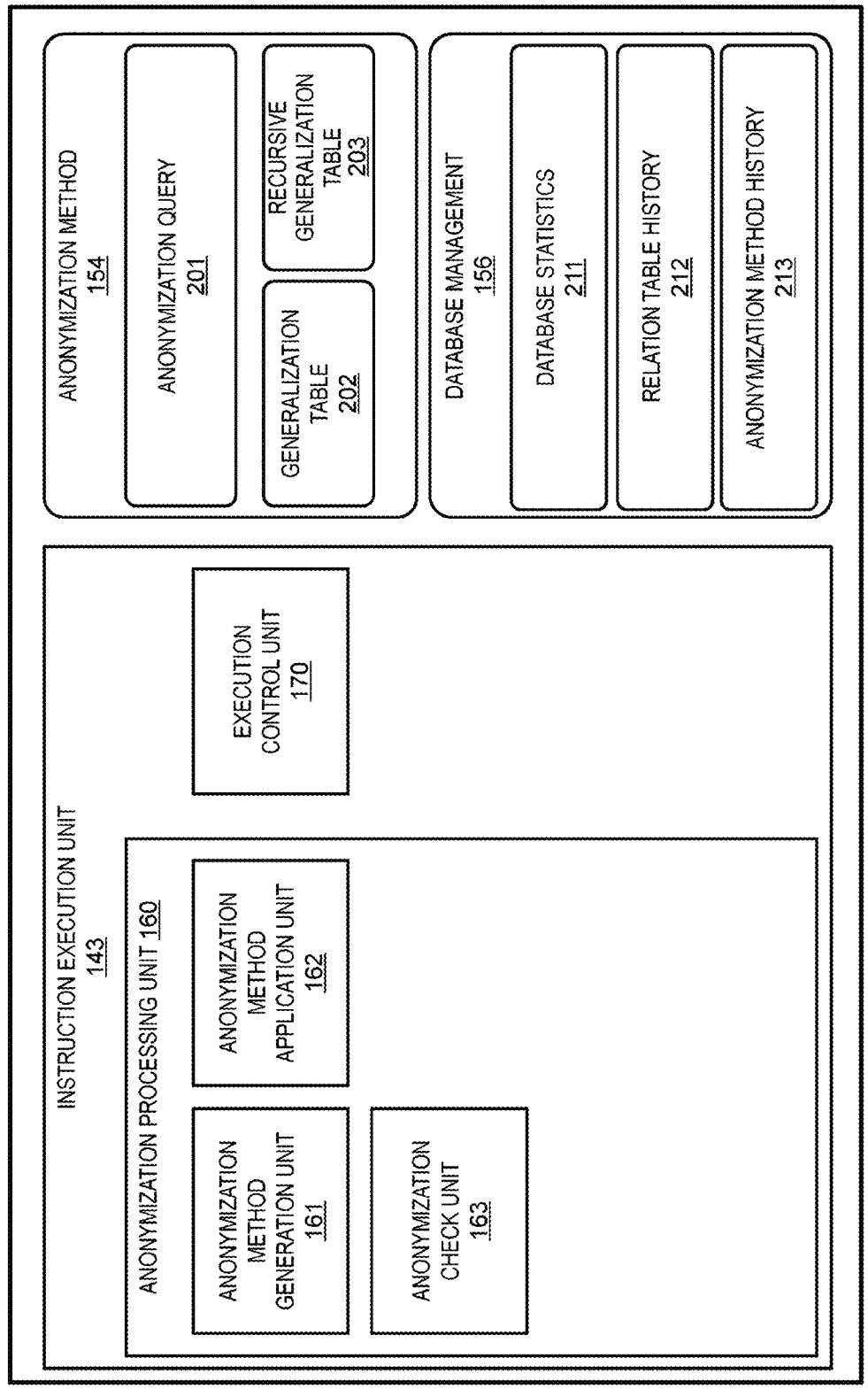
FIG. 2 is a diagram showing a configuration example of an instruction execution unit, an anonymization method, and database management shown in FIG. 1.

FIG. 1 is a diagram showing a configuration example of an entire system including a DB server that executes a DBMS according to an embodiment of the invention. FIG. 2 is a diagram showing details of a part of functions and information shown in FIG. 1.

A DB server 100 is an example of a computer system. The DB server 100 may be, for example, a personal computer, a workstation, or a mainframe, may be a virtual computer implemented by a virtualization program in the computers, and may be achieved on a cloud environment (for example, a calculation resource pool that includes a plurality of calculation resources, such as interface devices, storage devices, and processors).

A client 110 is connected to the DB server 100 via a network (not shown). The client 110 is an example of a query issuer, and issues an instruction such as a query to the database to the DB server 100. The network may be any of a fibre channel (FC) network, an Ethernet (registered trademark), an InfiniBand, and a local area network. An operator of the client 110 may be an administrator or a user.

For example, the storage system 120 is connected to the DB server 100 via a network (not shown). The storage system 120 includes a storage device 130B. When the storage system 120 receives an I/O request from the DB server 100, the storage system 120 executes I/O of data to or from the storage device 130B in response to the I/O request. The network to which the storage system 120 is connected may be the same as or different from the network to which the client 110 is connected.

The DB server 100 includes an interface unit 101, a storage device 130A, and a processor unit 102 connected to the interface unit 101 and the storage device 130A. The DB server 100 may include an input device (not shown) such as a keyboard and a pointing device, and an output device (not shown) such as a liquid crystal display. The input device and the output device may be connected to the processor unit 102. The input device and the output device may be integral.

The interface unit 101 is connected to the client 110 and the storage system 120 via one or more networks (not shown). The DB server 100 can communicate with the storage system 120 and the client 110 via the interface unit 101.

Each of the storage devices 130A and 130B includes one or more storage devices. Configurations of the storage devices 130A and 130B may be the same or different. A storage device 130 may include two or more storage devices of the same type (for example, having the same I/O performance), or the storage device 130 may include two or more storage devices of different types (for example, having different I/O performance). In the present embodiment, although a database 150 is stored in the storage device 130A, a part or all of the database 150 may be stored in the storage device 130B.

The storage device 130A stores a program executed by the processor unit 102 and data used by the program. Examples of the program include a DBMS 140 and an operating system (OS) 180. The DBMS 140 receives an instruction from the client 110 and executes the instruction. When executing the instruction, the DBMS 140 issues an input/output (I/O) request to the OS 180 to read data from the database or to write data into the database. The OS 180 receives the I/O request, issues an I/O request based on the I/O request to the storage device 130A, and returns a result to the DBMS 140.

The DBMS 140 manages information such as the database 150, an anonymization rule 151, a disclosure rule 152, a generalized hierarchy 153, an anonymization method 154, an anonymization result 155, and database management 156.

The anonymization rule 151 is present for each column constituting the relation table included in the database 150. For each column, the anonymization rule 151 is information indicating a plurality of generalization rules for the column.

The disclosure rule 152 is information indicating a disclosure rule. A typical example of the disclosure rule is a value of k (a lower limit of the value of k) if the anonymization is a k-anonymization and an value of l (a lower limit of the value of l) if the anonymization is l-diversification.

For each column constituting the relation table, the generalized hierarchy 153 can be generated based on the anonymization rule 151 corresponding to the column. The generalized hierarchy 153 is information indicating a relation of an attribute value and an attribute value increment (an attribute value range) and a relation of attribute value increments. The generalized hierarchy 153 is, for example, a tree structure in which attribute values and attribute value increments are nodes, but a structure other than the tree structure may be adopted.

The anonymization method 154 is information generated in response to an instruction. The anonymization method 154 is information indicating which piece of data (for example, which column) is anonymized in which manner. Specifically, for example, the anonymization method 154 includes at least one of one anonymization query 201, one or more generalization tables 202 (an example of generalization information), and one or more recursive generalization tables 203 (an example of recursive generalization information). In the present embodiment, the anonymization method 154 mainly includes one anonymization query 201 and the same number of generalization tables 202 as anonymization columns. The generalization table 202 can be generated from the recursive generalization table 203. Therefore, the inclusion of the generalization table 202 may be that the generalization table 202 itself is included, or may be that the recursive generalization table 203 is included instead of or in addition to the generalization table 202.

The anonymization result 155 is information as a result of applying the anonymization method 154 to the relation table included in the database 150.

The database management 156 is information on statistics and a history of the database 150. Specifically, for example, the database management 156 includes database statistics 211, a relation table history 212, and an anonymization method history 213. The database statistics 211 are statistical information of the database 150. The relation table history 212 is information indicating a history of a database operation ((for example, an operation (INSERT) that generates additional rows, or operations (UPDATE, DELETE) that delete rows) on the relation table. The anonymization method history 213 is information indicating a history of generation of the anonymization method.

The DBMS 140 includes an instruction reception unit 141, an instruction interpretation unit 142, an instruction execution unit 143, an instruction response unit 144, and a database management unit 145.

The instruction reception unit 141 receives a query or other instructions for the database from the client 110. The query is described, for example, by a structured query language (SQL).

The instruction interpretation unit 142 interprets the instruction received by the instruction reception unit 141.

The instruction execution unit 143 executes the instruction interpreted by the instruction interpretation unit 142. The instruction execution unit 143 includes an execution control unit 170 and an anonymization processing unit 160.

The execution control unit 170 controls execution of the instruction interpreted by the instruction interpretation unit 142. For example, the execution control unit 170 may generate a query plan necessary for executing the query based on the received query. The query plan may be, for example, information including one or more database operators and a relationship of an execution order of the database operators. The query plan may be represented by, for example, a tree structure having the database operators as nodes and the relationship of the execution order of the database operators as edges. The execution control unit 170 may execute a query in which the anonymization processing is unnecessary based on the query plan. When the anonymization processing is necessary, the execution control unit 170 may cause the anonymization processing unit 160 to execute the anonymization processing.

The anonymization processing unit 160 performs anonymization processing. The anonymization processing unit 160 includes an anonymization method generation unit 161, an anonymization method application unit 162, and an anonymization check unit 163.

The anonymization method generation unit 161 generates an anonymization method 154. The anonymization method application unit 162 applies the anonymization method 154 to the relation table. The anonymization check unit 163 checks a success or a failure of the anonymization.

The instruction response unit 144 returns a response including information as an execution result of the instruction.

The database management unit 145 refers to or updates the database statistics 211, the relation table history 212, and the anonymization method history 213.

The entire system according to the present embodiment has been described above. The configuration of the DBMS 140 is merely an example. For example, a certain component may be divided into a plurality of components, and a plurality of components may be integrated into one component. The storage device 130A may be a memory, and therefore, the database 150 may be an in-memory database. The data read from the database 150 by the DBMS 140 may be stored in a memory (for example, a work area) of the storage device 130A.

Figure 3:
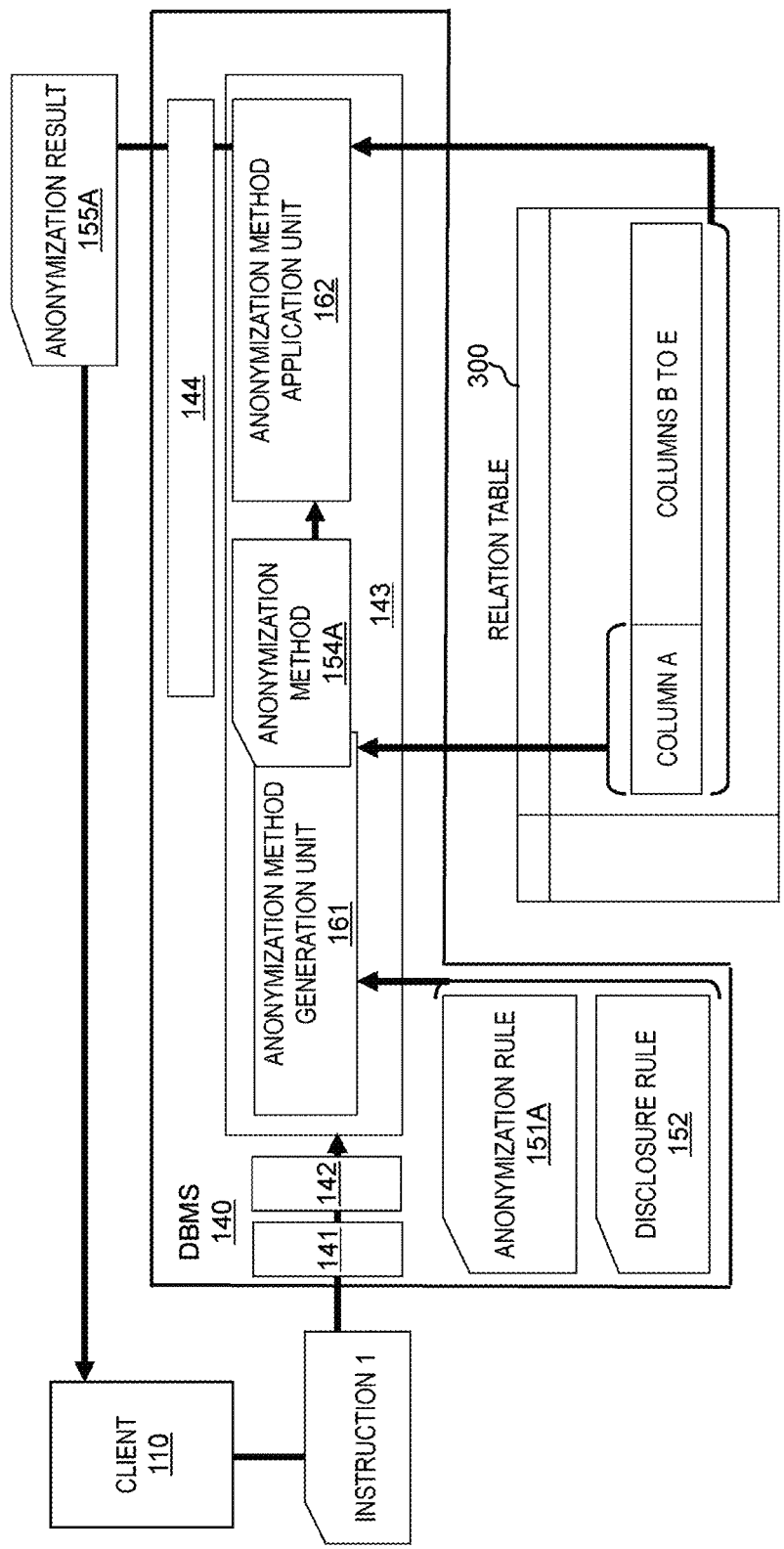
FIG. 3 is a schematic diagram of a flow of instruction processing 1.
Figure 4:
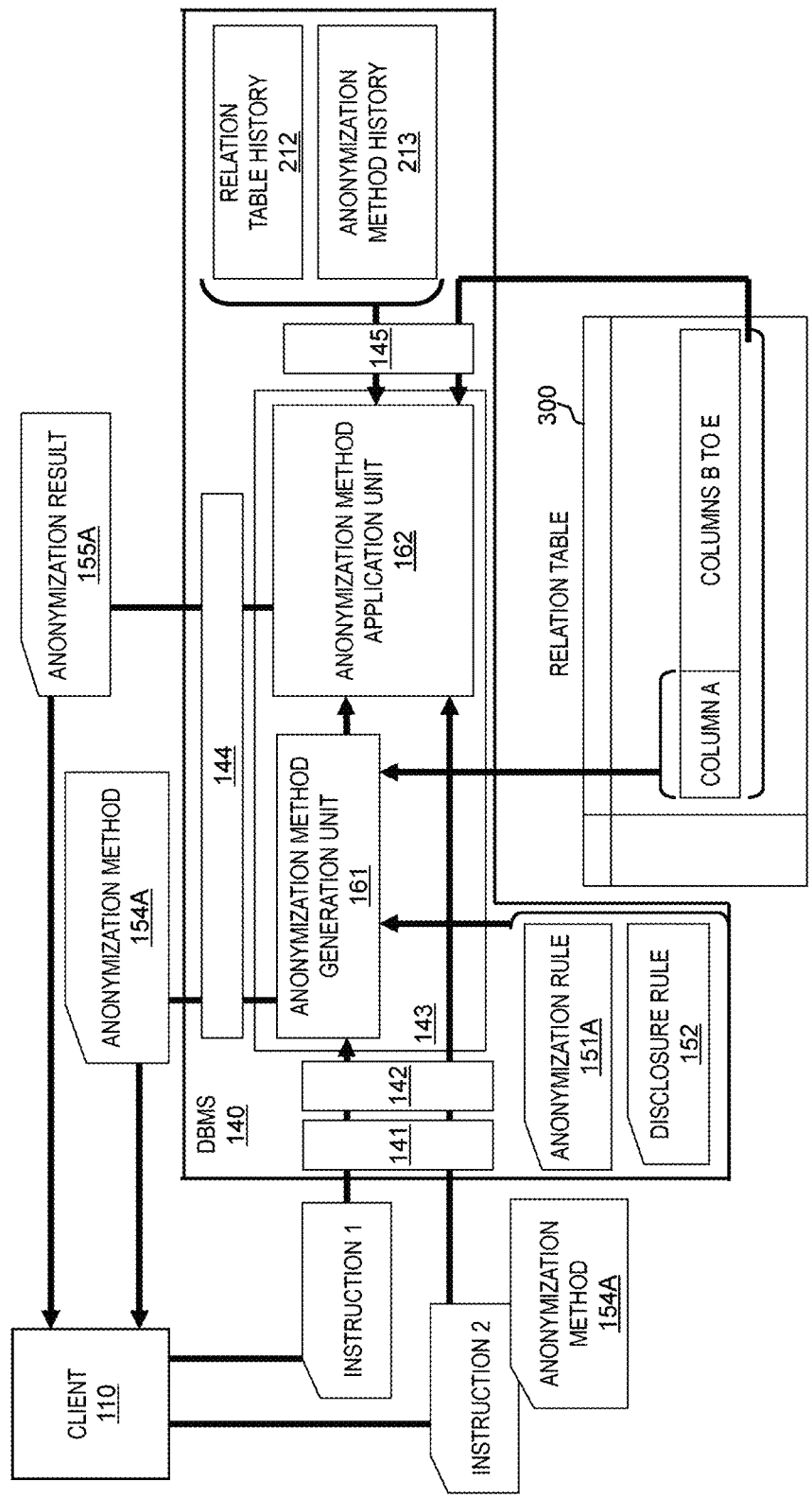
FIG. 4 is a schematic diagram of a flow of instruction processing 2.

In the present embodiment, the DBMS 140 can execute any of instruction processing 1 exemplified in FIG. 3 and instruction processing 2 exemplified in FIG. 4.

FIG. 3 is a schematic diagram of a flow of the instruction processing 1.

The instruction processing 1 is a processing of, in response to an instruction from the client 110, generating and applying the anonymization method 154, and responding to the anonymization result 155. That is, in the instruction processing 1, both generation and application of the anonymization method 154 are executed in response to one instruction. Specifically, the processing is as follows.

The instruction reception unit 141 receives an instruction 1 (an example of a first instruction) from the client 110. The instruction 1 is an instruction specifying the relation table 300 and specifying an anonymization rule 151A corresponding to a column A among the plurality of anonymization rules 151 using the column A as an anonymization column. The instruction interpretation unit 142 interprets the instruction 1.

In the instruction execution unit 143, in response to the instruction 1, the anonymization method generation unit 161 reads the column A in the relation table 300, and generates an anonymization method 154A of the column A based on the anonymization rule 151A and the disclosure rule 152. Thereafter, the anonymization method application unit 162 reads the relation table 300 (columns A to E) specified by the instruction 1, and applies the anonymization method 154A to the column A to anonymize the column A. The anonymization method application unit 162 generates an anonymization result 155A including all or part of the anonymized column A and the non-anonymized columns B to E. The instruction response unit 144 returns the anonymization result 155A to the client 110 as a response to the instruction 1.

In the instruction processing 1, in the generation of the anonymization method 154A, the columns A to E of the relation table 300 specified by the instruction 1 may be read in advance, and reading of the columns A to E may be unnecessary in the application of the anonymization method 154A. For example, the columns A to E can be read in a state where a calculation load is smaller than a predetermined load and a memory free capacity is equal to or larger than a predetermined capacity, and on the other hand, only the column A may be read in a state where a calculation load is equal to or larger than the predetermined load or the memory free capacity is smaller than the predetermined capacity.

FIG. 4 is a schematic diagram of a flow of the instruction processing 2.

The instruction processing 2 is a processing of, in response to instructions from the client 110, generating and responding to the anonymization method 154, and, in response to another instruction from the client 110, applying the anonymization method 154 and responding to the anonymization result 155. That is, in the instruction processing 2, although the anonymization method 154 is generated according to one instruction, the anonymization method 154 is not applied, and the anonymization method 154 is applied in response to another instruction. Specifically, the processing is as follows.

In response to the instruction 1 described above, the anonymization method 154A of the column A is generated, and the instruction response unit 144 returns the anonymization method 154A to the client 110 as a response to the instruction 1.

Thereafter, the instruction reception unit 141 receives an instruction 2 (an example of a second instruction) from the client 110. The instruction 2 is an instruction that specifies the relation table 300 and has the anonymization method 154A. The instruction interpretation unit 142 interprets the instruction 2.

In the instruction execution unit 143, the anonymization method application unit 162 reads the relation table 300 (columns A to E) specified by the instruction 2, and applies the anonymization method 154A to the column A to generate the above-described anonymization result 155A. The instruction response unit 144 returns the anonymization result 155A to the client 110 as a response to the instruction 2.

In the instruction processing 2, after receiving the generated anonymization method 154A as a response to the instruction 1 and checking the anonymization method 154A, the client 110 can transmit the instruction 2 of applying the anonymization method 154A.

In the instruction processing 2, a row of the relation table 300 may be deleted (UPDATE or DELETE) from the generation of the anonymization method 154A to the reception of the instruction 2. If a row is deleted after the generation of the anonymization method 154A, a disclosure rule such as the value of k or the value of l may not be satisfied at an application time point of the anonymization method 154A even if the disclosure rule is satisfied at a generation time point of the anonymization method 154A.

Therefore, in the present embodiment, in the instruction processing 2, the database management unit 145 determines whether to permit the application of the anonymization method 154A by referring to the relation table history 212 and the anonymization method history 213. When the application of the anonymization method 154A is permitted, the anonymization method application unit 162 applies the anonymization method 154A.

FIG. 5 is a diagram showing a configuration example of the relation table history 212 and the anonymization method history 213.

The relation table history 212 is, for example, information in a form of a table. The relation table history 212 has a row for each relation table 300. Each row holds information such as a relation table ID 501, an insertion date and time 502, a deletion date and time 503, a reference authority 504, and an output authority 505. In an example in FIG. 5, although a date and time is expressed by year, month, and day, the date and time may also be expressed in units (year, month, day, hour, minute and second) more specific than the year, month, and day.

The relation table ID 501 is an ID of the relation table 300. The insertion date and time 502 indicates a latest date and time when a row is inserted in the relation table 300. The deletion date and time 503 indicates a latest date and time when a row is deleted from the relation table 300. The reference authority 504 is a list of column IDs of columns to which a reference is permitted in the relation table 300 ("ALL" means all columns). The output authority 505 is a list of column IDs of the columns to which an output is permitted in the relation table 300 ("ALL" means all columns). The insertion date and time 502 and the deletion date and time 503 are updated by, for example, the instruction execution unit 143.

The anonymization method history 213 is, for example, information in a form of a table. The anonymization method history 213 has a row for each anonymization method 154. Each row holds information such as an anonymization method ID 511, a relation table ID 512, a generation date and time 513, and application information 514.

The anonymization method ID 511 is an ID of the anonymization method 154. The relation table ID 512 is an ID of the relation table 300 to which the anonymization method 154 is applied. The generation date and time 513 indicates a date and time when the anonymization method 154 is generated. The application information 514 indicates whether to apply the anonymization method 154 to the relation table 300 ("1" or "0"). The anonymization method ID 511, the relation table ID 512, and the generation date and time 513 are updated by, for example, the anonymization method generation unit 161. The application information 514 is updated by, for example, the database management unit 145.

In the instruction processing 2, when the generation date and time 513 of the anonymization method 154A is older than the deletion date and time 503 of the row of the relation table 300, the database management unit 145 updates the application information 514 to "0" (a value meaning an application inhibition). If the application information 514 corresponding to the anonymization method 154A is "1", the anonymization method application unit 162 applies the anonymization method 154A. However, if the application information 514 corresponding to the anonymization method 154A is "0", the anonymization method application unit 162 does not apply the anonymization method 154A. In such a manner, in the instruction processing 2, when the generation date and time 513 of the anonymization method 154A is older than the deletion date and time 503 of the row of the relation table 300 (that is, when the row of the relation table 300 is deleted after the generation of the anonymization method 154A), the database management unit 145 inhibits the application of the anonymization method 154A. Accordingly, an anonymization result that does not satisfy the disclosure rule can be prevented from being generated and disclosed to the client 110.

The present embodiment will be described in detail below.

Figure 6:
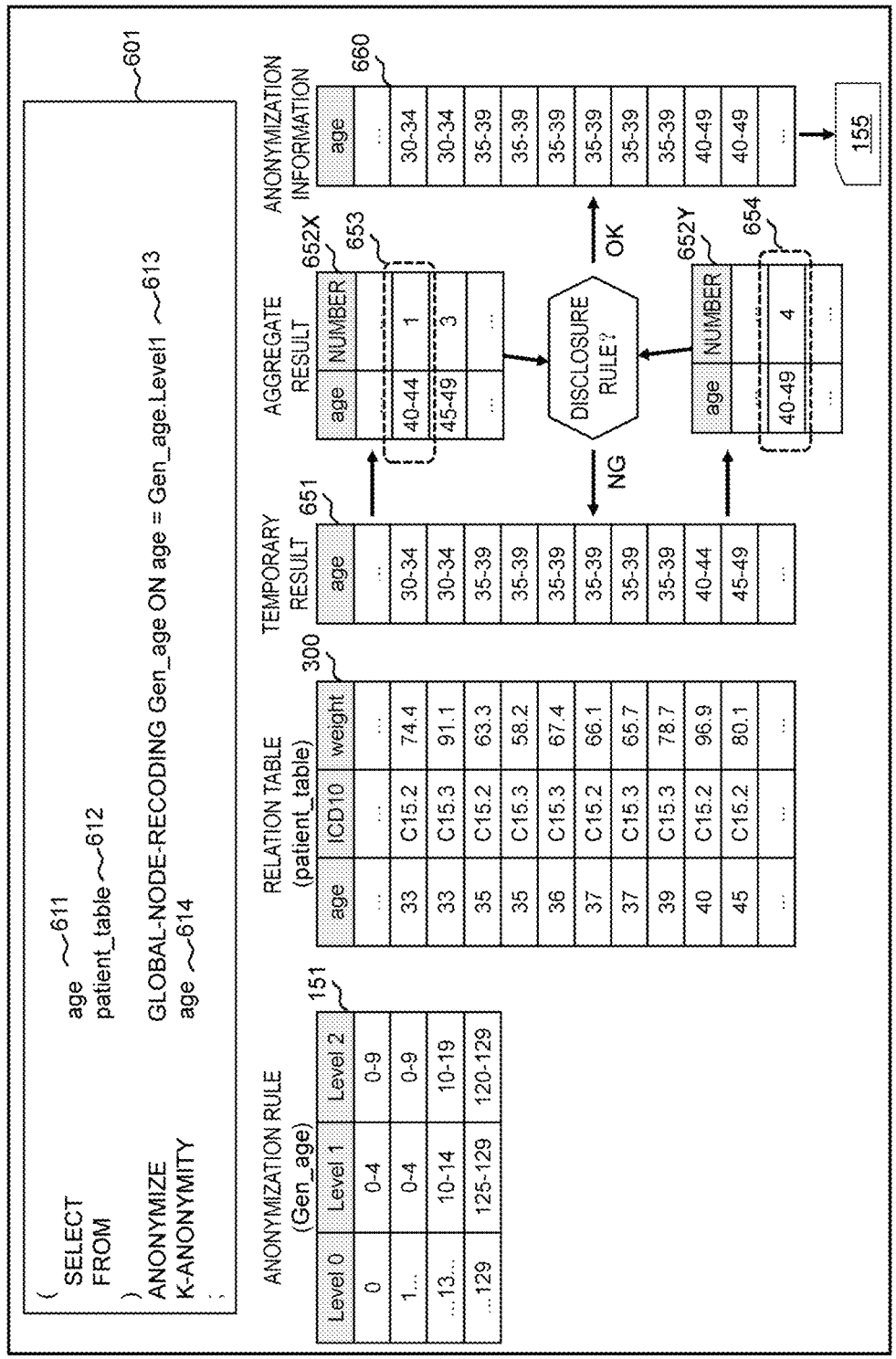
FIG. 6 is a diagram showing details of an example of anonymization processing.
Figure 7:
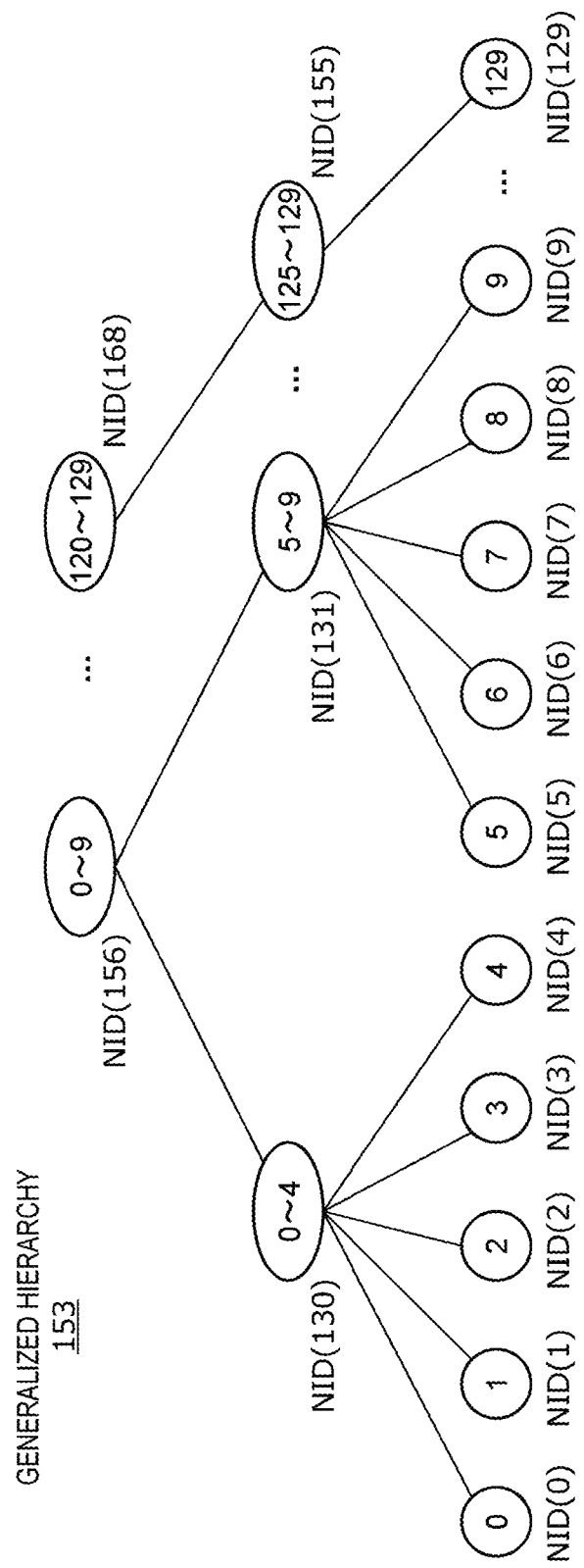
FIG. 7 is a diagram showing an example of a generalized hierarchy.
Figure 8:
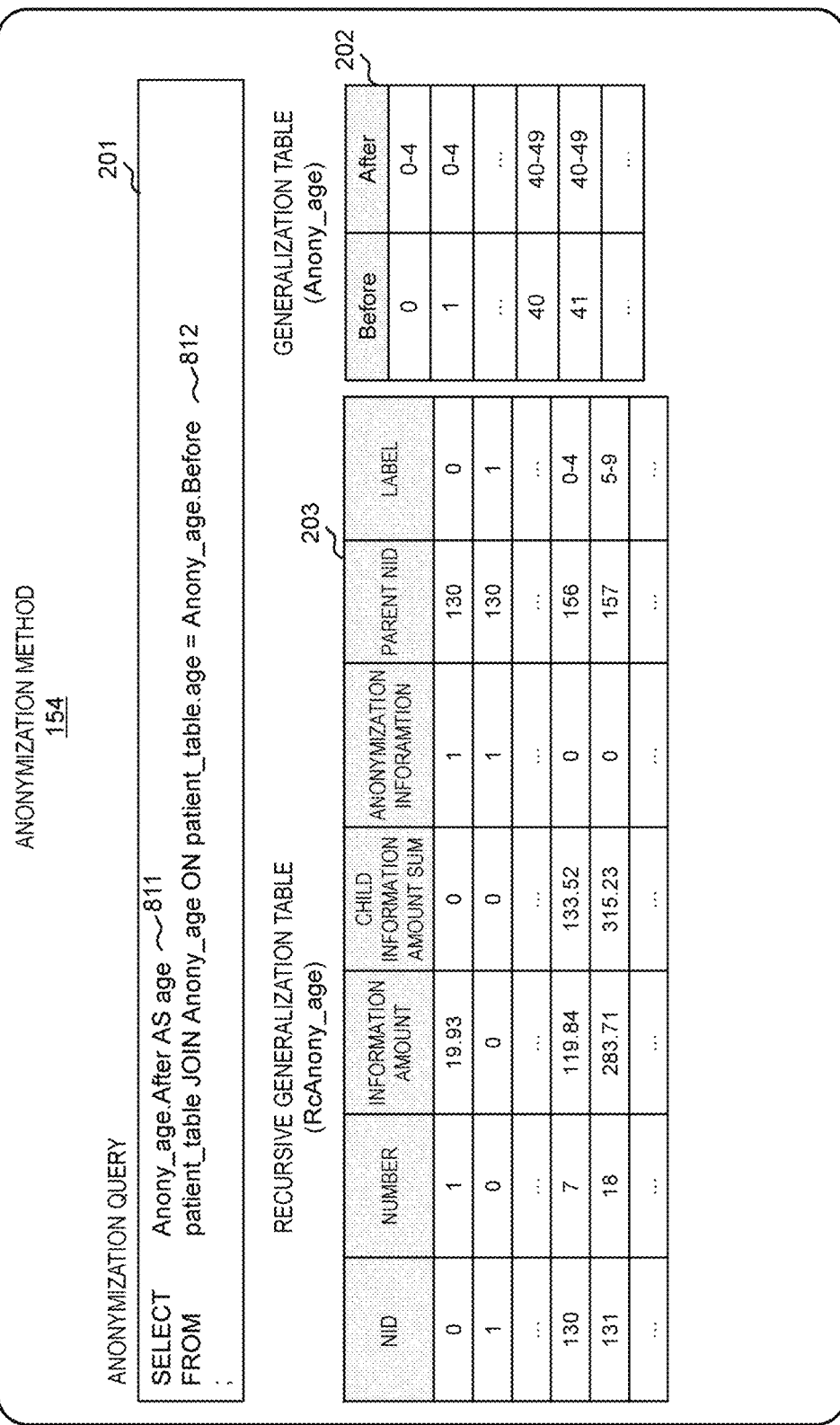
FIG. 8 is a diagram showing an example of the anonymization method.

FIG. 6 is a diagram showing details of an example of the anonymization processing. FIG. 7 is a diagram showing an example of the generalized hierarchy 153. FIG. 8 is a diagram showing an example of the anonymization method 154. An example of the anonymization processing will be described in detail with reference to FIGS. 6 to 8.

It is assumed that the anonymization rule 151 (the anonymization rule 151 named "Gen_age") and the relation table 300 (the relation table 300 named "patient_table") are present. The anonymization rule 151 indicates a plurality of generalization rules "Level 0" (1 year old for each increment), "Level 1" (5 years old for each increment), and "Level 2" (10 years old for each increment). It is assumed that the relation table 300 includes a column "age", a column "ICD 10", and a column "weight".

The instruction 601 is an example of the first instruction, and is an example of an instruction used in the instruction processing 1. The instruction 601 includes a column specification 611, a table specification 612, a processing content specification 613, and an anonymization column specification 614.

The column specification 611 is a specification of a column set to be a component of the anonymization result 155. In an example in FIG. 6, since a value of the column specification 611 is "age", the specified column is only the column "age".

The table specification 612 is a specification of the relation table 300 which is a source of reading. In the example in FIG. 6, since a value of the table specification 612 is "patient_table", the specified relation table 300 is the relation table 300.

The processing content specification 613 is a detailed specification of the anonymization processing. The specification includes, for example, a function "ANONYMIZE". An example of details is as follows.

In the processing content specification 613, "target specification-range specification-RECODING" corresponds to a specification of how to apply the generalization rules to the anonymization column.

The "target specification" is a specification of an anonymization target. A value of the "target specification" is, for example, "GLOBAL" or "LOCAL". The "GLOBAL" means that entire anonymization columns are the anonymization target. The "LOCAL" means that only a part of the anonymization columns are the anonymization target.

The "range specification" is a specification of an application range of the same generalization rule among the anonymization targets. The value of the "range specification" is, for example, "LEVEL" or "NODE". The "LEVEL" means that the application range of the same generalization rule is the entire anonymization target. Therefore, for example, the same generalization rule "Level 1" is applied to the entire anonymization target (for example, the entire anonymization column). On the other hand, the "NODE" means that the application range of the same generalization rule is only the entire lower nodes of a node that satisfies a predetermined condition. Therefore, for example, it can be specified that the generalization rule "Level 1" is applied to the 30-year old, and the generalization rule "Level 2" is applied to the 40-year old.

As described above, for example, "GLOBAL-LEVEL-RECODING" means that the same generalization rule is applied to the entire anonymization columns. For example, "GLOBAL-NODE-RECODING" means that a certain generalization rule may be applied to a certain attribute value range among the entire anonymization columns and another generalization rule may be applied to another attribute value range.

In the processing content specification 613, "Gen_age" is an example of a value of rule specification. The "rule designation" is a specification of the anonymization rule 151. According to the example in FIG. 6, the anonymization rule 151 is specified.

In the processing content specification 613, "age=Gen_age.Level1" is an example of the value of a combination condition. As referred to herein, the "combination condition" includes a specification of a generalization rule to be applied, and means a combination of an anonymization column and a column as a result obtained by anonymizing the anonymization column by the generalization rule. According to the example in FIG. 6, the combination condition means a combination of the column "age" and a column as a result obtained by anonymizing the column "age" using the generalization rule "Level 1" indicated by the anonymization rule 151. An example of the result of the combination is the generalization table 202 in FIG. 8.

The processing content specification 613 may include an optional specification (not shown). For example, a specification "DELETE (x)" may be an example of the optional specification. "DELETE (x)" means that an inner x % of the anonymization column is allowed to be deleted in order to satisfy the disclosure rule (for example, the value of k or the value of l).

The anonymization column specification 614 is a specification of an anonymization type and the anonymization column. "K-ANONYMITY" is a value that means k-anonymization as the anonymization type, and "age" corresponding to the value means that the anonymization column of anonymization according to the k-anonymization is the column "age".

According to the instruction 601, the following anonymization processing is performed.

The anonymization method generation unit 161 reads the column "age" (an example of the first column) from the relation table 300 in response to the instruction 601. The anonymization method generation unit 161 generates a temporary result 651 (an example of a first temporary result) obtained by generalizing each of the attribute values of the column "age" based on the generalization rule "Level 1". The value constituting the temporary result 651 is a generalized value in which the attribute value of the column "age" is a value generalized by the generalization rule "Level 1".

The anonymization method generation unit 161 generates an aggregate result 652X (an example of a first aggregate result) obtained by aggregating the temporary result 651. The aggregate result 652X indicates a sum of the generalized values for each generalized value.

The anonymization method generation unit 161 determines whether the aggregation result 652X satisfies a disclosure rule indicated by the disclosure rule 152. For example, when value of k=3 in the disclosure rule, the value of k is not satisfied because the number of a generalized value "40-44" is less than the value of k, as indicated by a reference numeral 653. Therefore, a determination result NG is obtained. In this case, the anonymization method generation unit 161 applies a generalization rule having a larger generalization degree to the attribute value that is a source of the generalized value of all or a part of the temporary result 651 in accordance with the processing content specification 613. According to the example in FIG. 6, since "GLOBAL-NODE-RECODING" is used, a generalization rule "Level 2" having a larger generalization degree by one is applied to each attribute value belonging to a part of an attribute value range "40-49". Therefore, the generalized value "40-49" is obtained instead of each of the generalized value "40-44" and the generalized value "45-49". As a result, the aggregate result 652Y is obtained. According to the aggregate result 652Y, as indicated by a reference numeral 654, the number of a value less than the value of k is not present.

The anonymization method generation unit 161 determines whether the aggregation result 652Y satisfies a disclosure rule indicated by the disclosure rule 152. Since the number of a value less than the value of k is not present as described above, a determination result OK is obtained. In this case, the anonymization method generation unit 161 generates the anonymization method 154 exemplified in FIG. 8, that is, the anonymization method 154 including at least the generalization table 202.

The anonymization method application unit 162 applies the anonymization method 154 to the column "age" specified by the column specification 611 to obtain the anonymization information 660. The anonymization result 155, which is all or a part of the anonymization information 660, is returned to the client 110 by the instruction response unit 144 as a response to the instruction 601. The anonymization result 155 returned to the client 110 may be a summary (for example, an aggregate result 652Y) of the result of the anonymization processing, instead of the detail exemplified in FIG. 6.

For the column "age", the generalized hierarchy 153 exemplified in FIG. 7 is obtained based on the column "age" and the anonymization rule 151. The generalized hierarchy 153 is expressed by a tree structure in which a smallest value of the generalization degree is an end node and a largest value of the generalization degree is a most upper node. The recursive generalization table 203 of the column "age" is obtained by expressing the generalized hierarchy 153 in a form of a table. Specifically, the generalized hierarchy 153 is, for example, as follows.

A plurality of possible attribute values are a plurality of end nodes. Here, each of a plurality of values obtained by applying the generalization rule "Level 0" having the smallest generalization degree to each of the plurality of possible attribute values is set as a respective one of a plurality of end nodes. For each end node, a generalized value is obtained by applying a generalization rule "Level 1" having a larger generalization degree by one to a value corresponding to the node. The same generalized value is set as one node, and a node of a value that is a source of the generalized value corresponding to the node is set as a child node. In such a manner, a node is also obtained for the generalization rule "Level 2" having the largest generalization degree. A node ID is allocated to each node. In the shown example, "NID" means the node ID, and "NID (x)" (x is an integer of 0 or more) means the node ID=x.

In the following description, for a certain node, a node corresponding to a value having a larger generalization degree may be referred to as an "upper node", and specifically, a node corresponding to a value having a larger generalization degree by one may be referred to as a "parent node". On the other hand, for a certain node, a node corresponding to a value having a smaller generalization degree may be referred to as a "lower node", and specifically, anode corresponding to a value having a smaller generalization degree by one may be referred to as the "child node". In the shown example, the parent node of a node NID (130) is a node NID (156), and child nodes of the node NID (130) are end nodes NID (0) to NID (4).

With reference to FIG. 7, an example of "GLOBAL-NODE-RECODING" exemplified in FIG. 6 will be described as follows. That is, according to the aggregate result 652X, since the number of the generalized value "40-44" is "1", a node corresponding to the generalized value "40-44" (5 years old for each increment) is specified. Then, a parent node of the node, that is, anode corresponding to the generalized value "40-49" (10 years old for each increment) is specified. The generalization rule "Level 2" is applied to all lower nodes of the node corresponding to the generalized value "40-49". Therefore, the generalized value "40-49" is obtained instead of each of the generalized value "40-44" and the generalized value "45-49". In such a manner, when a value of the range specification is "NODE", a generalization rule having a larger generalization degree is applied to a range in which a certain node is a top node.

As shown in FIG. 8, the anonymization method 154 includes at least the generalization table 202.

The generalization table 202 (the generalization table 202 named "Anony_age") is information in a form of a table, and includes a column "Before" and a column "After". The column "Before" is an anonymization column before the anonymization (that is, a copy of the column "age"). The column "After" is an anonymization column after the anonymization. According to the column "After" exemplified in FIG. 8, a generalized value to which the generalization rule "Level 1" (5 years old for each increment) is applied and a generalized value to which the generalization rule "Level 2" (10 years old for each increment) is applied are mixed. The mixed manner is to protect the disclosure rule. The generalization table 202 is present for each anonymization column. Although in the example of FIG. 8, one generalization table 202 is present since one anonymization column is present, two or more generalization tables 202 are generated when two or more anonymization columns are present. That is, the same number of generalization tables 202 as the anonymization columns are generated.

The anonymization query 201 may be an example of the instruction 2 shown in FIG. 4, that is, an example of an instruction having the anonymization method 154. Although in the present embodiment, conceptually, the anonymous processing method 154 includes the anonymization query 201, the anonymization query 201 may not be included in the anonymization method 154. The anonymization query 201 includes a column specification 811 and a table specification 812.

The column specification 811 includes a specification of an anonymization column and a specification of an output after the anonymization of the anonymization column. "Anony_age.after AS age", which is an example of the column specification 811, means outputting the column "After" after the anonymization of the column "age".

The table specification 812 includes a specification of the generalization table 202 and a specification of performing anonymization using the generalization table 202. "patient_table JOIN Anony_age ON patient_table.age=Anony_age.Before", which is an example of the table specification 812, means anonymizing the column "age" using the generalization table 202, in other words, obtaining the column "After" corresponding to the column "Before".

The recursive generalization table 203 (the generalization table 202 named "RcAnony_age") is information in a form of a table, and is information used to generate the generalization table 202. The information expressing the recursive generalization table 203 by a tree structure is the generalized hierarchy 153 exemplified in FIG. 7. The generalization table 202 can be generated based on the recursive generalization table 203. Therefore, the recursive generalization table 203 is generated for each anonymization column. That is, the same number of the recursive generalization tables 203 as the anonymization columns are generated. The recursive generalization table 203 corresponds to a so-called intermediate product in which an input is set as a column "age" (an example of the anonymization column) and an output is set as the generalization table 202. For example, in response to the instruction 601 exemplified in FIG. 6, the recursive generalization table 203 is generated before the generalization table 202 is generated, and then the generalization table 202 is generated using the recursive generalization table 203. The recursive generalization table 203 may be returned as a final product to an instruction source (for example, the client 110 or the administrator). In the instruction source, a distribution (a bias) of the data before the anonymization or after the anonymization can be grasped by referring to the recursive generalization table 203.

The recursive generalization table 203 includes, for example, columns "NID", "number", "information amount", "child information amount sum", "anonymization information", "parent NID", and "label". Each value in the columns will be described by taking one node (a "node of interest" in the description of FIG. 8) as an example. The recursive generalization table 203 has information indicating a parent-child relationship of nodes as described below, and the generalization table 202 can be generated from the parent-child relationship. A set of "label" and "number" in the recursive generalization table 203 corresponds to the aggregate result 652 described above.

A value in the column "NID" is the node ID of the node of interest.

A value in the column "number" is the number of attribute values (attribute values in the column "age") belonging to the node of interest.

A value in the column "information amount" is an information amount according to the number of attribute values belonging to the node of interest. For example, for the node of interest, the information amount satisfies a relationship of, information amount=(the number of node of interest)×log$_2$ {(the number of node of interest)/(the total number of rows of column "age")}.

A value in the column "child information amount sum" is a sum of information amount of all child nodes of the node of interest. For the node of interest, child information amount sum−information amount=information loss amount. In the present embodiment, the anonymization processing can be executed so as to minimize the information loss amount.

A value in the column "anonymization information" means whether anonymization is to be executed. "1" means that the anonymization is to be executed, and "0" means that the anonymization is not to be executed.

A value in the column "parent NID" is a node ID of the parent node of the node of interest.

A value in the column "label" is a label of the node of interest, for example, an attribute value or an attribute value range (in other words, a generalized value) corresponding to the node of interest. In the example, the label is an attribute value or an attribute value range in the column "age". In other words, the label is an example of an attribute value or a generalized value that may be obtained relating to the column "age".

According to FIG. 8, for example, the following processing is performed. That is, since the anonymization information corresponding to NID (0) is "1", the anonymization method generation unit 161 determines to execute anonymization of the label (the attribute value) "0" corresponding to the node NID (0). However, according to the row in which the parent NID (130) of the NID (0) is set as NID (130), the anonymization method generation unit 161 does not execute anonymization since the anonymization information is "0".

The above is an example of the anonymization processing and the anonymization method 154. According to the examples in FIGS. 6 to 8, since the anonymization column is only "age", one generalization table 202 corresponding to the column "age" and one recursive generalization table 203 are generated. Here, assuming that anonymization columns are two columns of "age" and "ICD 10", one anonymization query 201 (a query for anonymization processing of the column "age" and the column "ICD 10"), two generalization tables 202 (a generalization table of the column "age" and a generalization table of the column "ICD 10"), and three recursive generalization tables 203 (a recursive generalization table of the column "age", a recursive generalization table of the column "ICD 10", and a recursive generalization table of the column "age"+the column "ICD 10") are generated. Assuming that anonymization columns are three columns of "age", "ICD 10" and "weight", one anonymization query 201 (a query for anonymization processing of the column "age", the column "ICD 10" and the column "weight"), three generalization tables 202 (a generalization table of the column "age", a generalization table of the column "ICD 10", and a generalization table of the column "weight"), and four recursive generalization tables 203 (a recursive generalization table of the column "age", a recursive generalization table of the column "ICD 10", a recursive generalization table of the column "weight", and a recursive generalization table of the column "age"+the column "ICD 10"+the column "weight") are generated. In such a manner, when the number of anonymization columns is n (n is an integer equal to or larger than 2), one anonymization query 201, n generalization tables 202, and (n+1) recursive generalization tables 203 are generated. Therefore, even if the number of anonymization columns increases, it is unnecessary to generate an anonymization method for each combination of anonymization columns, and as a result, speed-up of the anonymization processing can be expected.

Figure 9:
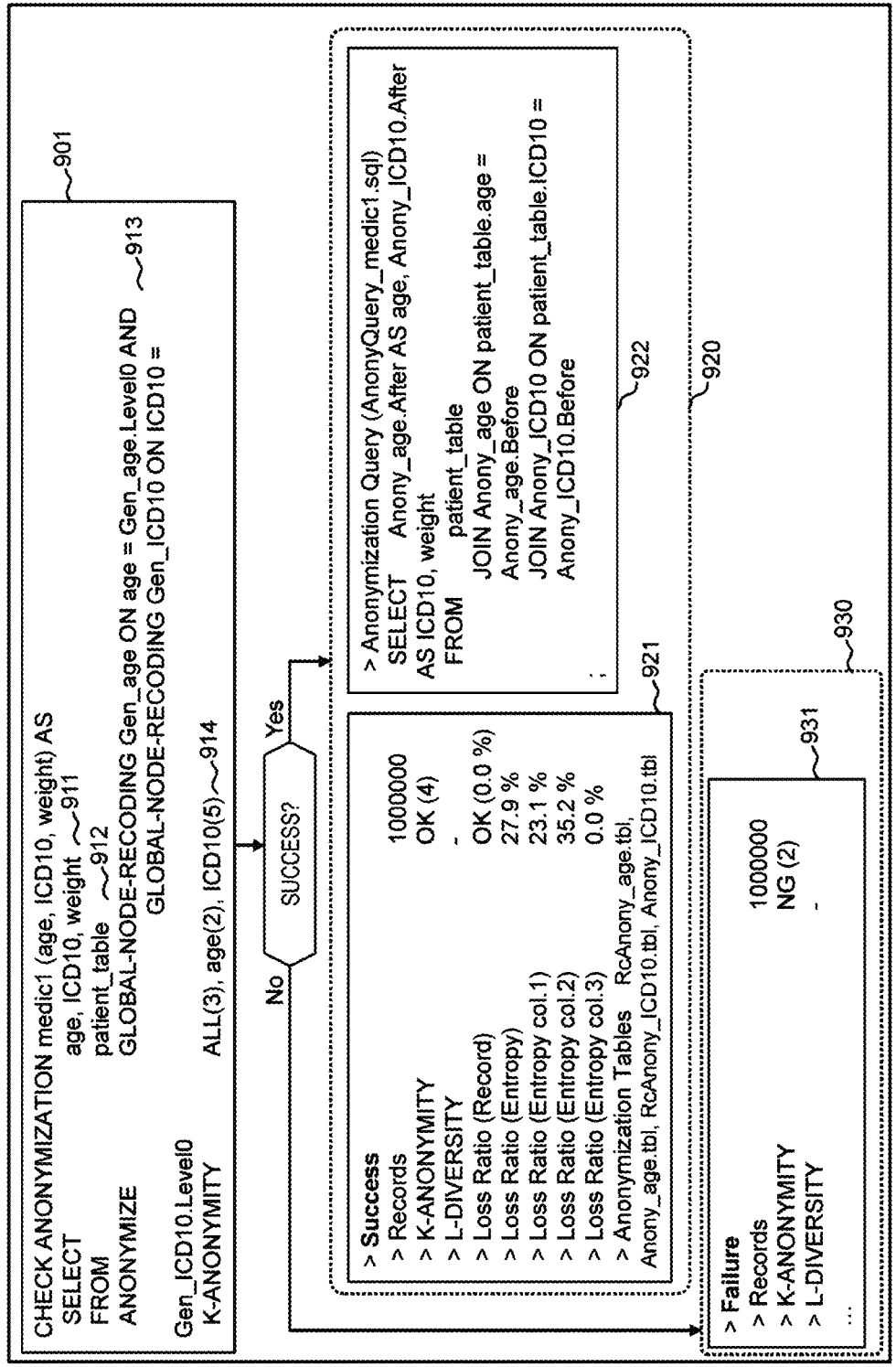
FIG. 9 is a diagram showing an example of an instruction for check of anonymization and a response to the instruction.

FIG. 9 is a diagram showing an example of an instruction for check of the anonymization and a response to the instruction.

In the present embodiment, a function "CHECK ANONYMIZATION" is prepared for the check of the anonymization. The instruction reception unit 141 receives the instruction 901 specifying the function, and the anonymization check unit 163 can execute the function "CHECK ANONYMIZATION" in response to the instruction 901.

The configuration of the instruction 901 may be similar as the configuration of the instruction 601 exemplified in FIG. 6, except for check (pre-execution) of success or failure of the anonymization or the execution of the anonymization. That is, the instruction 901 includes a column specification 911, a table specification 912, a processing content specification 913, and an anonymization column specification 914.

According to the anonymization column specification 914 exemplified in FIG. 9, the column "age" and the column "ICD 10" are specified as the anonymization columns.

According to the anonymization column specification 914, a value of k is specified for each anonymization column. The value of k of the column "age" is a numerical value (that is, value of k=2) in parentheses of "age (2)". The value of k of the column "ICD 10" is a numerical value (that is, value of k=5) in parentheses of "ICD 10 (5)". As an anonymization type specified in the anonymization column specification 914, if "L-DIVERSITY" is used instead of or in addition to "K-ANONYMITY", an value of l may be specified for each anonymization column. Hereinafter, in order to avoid confusion, disclosure rules such as the value of k and the value of l that are specified in the anonymization column specification 914 may be referred to as "user specified disclosure rules", and the disclosure rules indicated by the disclosure rules 152 may be referred to as "default disclosure rules" or simply "disclosure rules". A user specified disclosure rule such as the value "3" indicated by "ALL (3)" may be referred to as a "user specified common disclosure rule".

Further, according to the anonymization column specification 914, a common value of k for all specified anonymization columns is specified. The common value of k is a numerical value (that is, common value of k=3) in parentheses of the "ALL (3)". Although in the shown example, the value of k "2" of the column "age" is less than the common value of k "3", in this case, "ALL" or individual anonymization columns may be given priority according to a predetermined policy (an example thereof will be described later with reference to FIG. 10).

The anonymization check unit 163 executes processing for generating the anonymization method 154 according to the instruction 901. In the processing, the anonymization check unit 163 executes a success/failure determination of whether an anonymization permission condition such as a default disclosure rule or a user specified disclosure rule (a condition to permit execution of anonymization) is satisfied based on information such as the aggregate result 652 obtained halfway. If a result of the success/failure determination is true, the anonymization check unit 163 generates a success response 920. If the result of the success/failure determination is false, the anonymization check unit 163 generates a failure response 930. A detail of the success/failure determination may be the same as processing shown in FIG. 14. The success/failure determination may be anonymization check processing, that is, processing of determining whether the anonymization method 154 can be generated so as to satisfy the anonymization permission condition.

The success response 920 may include at least one of a check result report 921 and an anonymization query 922.

The check result report 921 may include statistical information obtained in the success/failure determination. For example, the check result report 921 may include "Success" (a value that means a success of the anonymization), "Records" (the number of rows of the relation table 300 specified in the table specification 912), "K-ANONYMITY" (a minimum value among the values of k obtained in the success/failure determination), "Loss Ratio (Record)" (a ratio of the number of rows deleted in the success/failure determination), and "Loss Ratio (Entropy)" (a ratio of the information amount lost in the generation of the anonymization method 154). For example, according to a value "OK (4)" corresponding to "K-ANONYMITY", the minimum value of k "4" is equal to or larger than a value of k "3" (and the value of k "3" which is the user specified common disclosure rule) which is an example of the default disclosure rule, and thus satisfies both the default disclosure rule and the user specified disclosure rule. A value corresponding to the "Loss Ratio (Record)" may be compared with a value x of the optional specification "DELETE (x)" described above.

The anonymization query 922 is an anonymization query for obtaining the result indicated by the check result report 921. The instruction reception unit 141 receives the anonymization query 922 as an example of the instruction 1 and the instruction processing 1 or the instruction processing 2 is executed, so that the anonymization result 155 or the anonymization method 154 is returned as a response.

The failure response 930 includes a check result report 931. The check result report 931 includes "Failure" (a value that means a failure of the anonymization) and information indicating a condition that has not been satisfied among the anonymization permission conditions. One example of the condition is "K-ANONYMITY". According to the check result report 931, since the minimum value of k "2" is less than the value of k "3" (and the value of k "3" which is the user specified common disclosure rule) which is an example of the default disclosure rule, it is known that the anonymization has failed.

The client 110 may transmit the instruction 901 to the DBMS 140 and pre-ascertain whether the anonymization is successful by receiving a success response 920 or a failure response 930.

Figure 10:
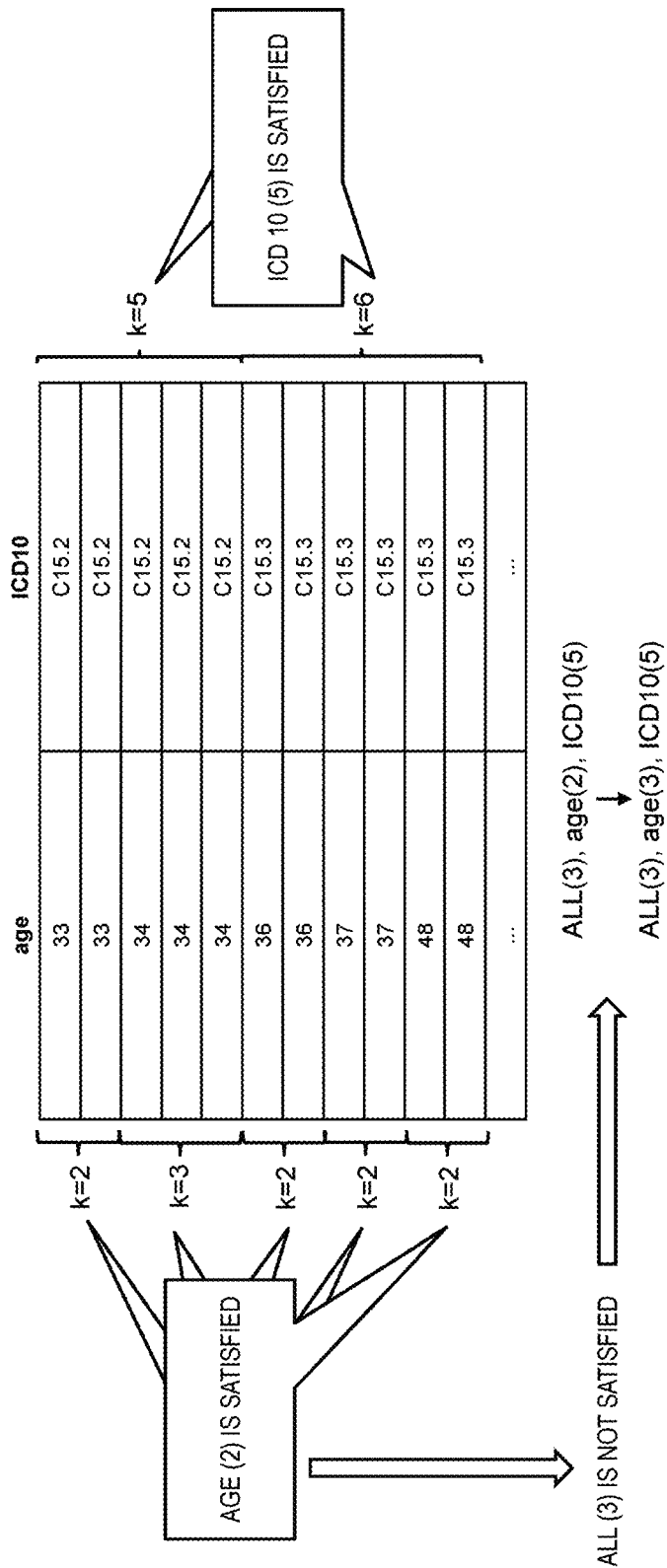
FIG. 10 is a diagram showing an example of processing performed when a user specified common disclosure rule and an individual user specified disclosure rule conflict with each other.

FIG. 10 is a diagram showing an example of processing performed when the user specified common disclosure rule and the individual user specified disclosure rule conflict with each other.

In an example shown in FIG. 10, both the generalization degree of the generalization rule applied to the anonymization column "age" and the generalization degree of the generalization rule applied to the anonymization column "ICD 10" are set to a minimum generalization degree (in other words, a generalization degree in which the attribute value itself is adopted as the generalized value). If the generalization rule of such a generalization degree is applied, the user specified disclosure rule is satisfied for both anonymization columns "age" and "ICD 10".

However, the user specified disclosure rule (the age (2)) of the anonymization column "age" does not satisfy the user specified common disclosure rule (the ALL (3)), as described above. Therefore, for the column "age", an attribute value (for example, "33", when k=2) that satisfies the age (2) but does not satisfy the ALL (3) may be generated.

Therefore, in the present embodiment, both the anonymization method generation unit 161 and the anonymization check unit 163 perform the following processing. That is, the ALL (x), a column name (y), and Default (z) (a value indicated by the default disclosure rule is z) are assumed. If z≤x≤y is not established, both the anonymization method generation unit 161 and the anonymization check unit 163 update the value of k of x or y as described below. According to the example in FIG. 10, (2) is adopted. Accordingly, both the conflict between the user specified common disclosure rule and the individual user specified disclosure rule and the conflict between the user specified common disclosure rule and the default disclosure rule can be resolved.

(1) When "x<z", z is assigned to x.
(2) When "y<x", x is assigned to y.

FIG. 11 is a diagram showing an example of the disclosure rule 152.

Disclosure rules indicated by the disclosure rule 152 may include at least one of the following as shown in addition to at least one of "K-ANONYMITY" (value of k in k-anonymity) and "L-DIVERSITY" (value of l in l-diversity).

- "authorization recipient": The term authorization recipient means a type of the instruction source. For example, "admin" means the administrator. "USER 01" means a highly reliable user. "USER 02" means a low reliable user. Depending on reliability of the user, the value of k or the value of l is determined, and information to be output is restricted.
- "object name": The term object name means a relation table that can be referred to.
- "SELECT": The term SELECT means a reference permission.
- "OUTPUT TABLE": The term OUTPUT TABLE means an output permission. A value P such as "100" or "90" means that P % of the row to be output is output. A value Q, such as "on" or "off", means a presence or absence of a guarantee of the value of k (or value of l) of the anonymization result. "On" means that a guarantee is present, and "off" means that no guarantee is present.
- "CHECK ANONYMIZATION": The term "CHECK ANONYMIZATION" means whether to permit a precheck of a success or a failure of the anonymization and an output of the check result report. "yes" means permission, and "no" means inhibition.
- "CREATE STATIC VIEW": The term "CREATE STATIC VIEW" means whether to permit generation of the anonymization method 154. "yes" means permission, and "no" means inhibition.
- "IMPORT ANONYMIZATION": The term "IMPORT ANONYMIZATION" means whether to permit import (application) of the anonymization method 154. "yes" means permission, and "no" means inhibition.
- "EXPORT ANONYMIZATION": The term "EXPORT ANONYMIZATION" means whether to permit an export of the anonymization method 154. "yes" means permission, and "no" means inhibition.
- "OUTPUT ANONYMIZATION": The term "OUTPUT ANONYMIZATION" means whether to permit an output of the anonymization method. For example, it may be possible to specify whether to permit an output of the anonymization query 201, whether to permit an output of the recursive generalization table 203 (for example, only to permit hierarchy information, only to permit specific columns of "number" or "information amount"), and whether to permit an output of the generalization table 202.

"SELECT" is an example of a reference authority. The "OUTPUT TABLE" and the "OUTPUT ANONYMIZATION" are examples of output authorities.

According to the disclosure rule 152 exemplified in FIG. 11, for example, when the instruction reception unit 141 receives an instruction, the instruction interpretation unit 142 may specify the type of the instruction source by interpreting the instruction, and the instruction execution unit 143 may control the execution of the instruction and a response as a result of the instruction in accordance with a specified instruction source type. In such a manner, disclosed information can be restricted depending on the type of the instruction source (for example, reliability).

According to an example in FIG. 11, the output authority can be set. That is, even if a reference to generate the anonymization method 154 is permitted, the output authority that the output of all or a part of the anonymization result 155 is inhibited can be set. One example is, for example, as follows.

A part or all information of the anonymization result 155 is reduced, so that even if the anonymization result 155 before information reduction satisfies the value of k (or the value of l), the anonymization result 155 after the information reduction may not satisfy the value of k (or the value of l). Therefore, in "OUTPUT TABLE", it is determined whether to guarantee the value of k (or the value of l) when the information of (100−P) % from the anonymization result 155 is reduced by the combination of the value P and the value Q. Accordingly, whether to output the anonymization result 155 after the information reduction can be controlled even if the value of k (or the value of l) is not satisfied when the information is reduced from the anonymization result 155.

By setting a part or all of the anonymization method 154 as an output inhibition target, the disclosed information can be restricted. For example, by setting a part or all of the recursive generalization table 203 as the output inhibition target, whether contents of information displayed in an anonymization management view, which will be described later, and an anonymization management view can be output can be controlled.

Figure 12:
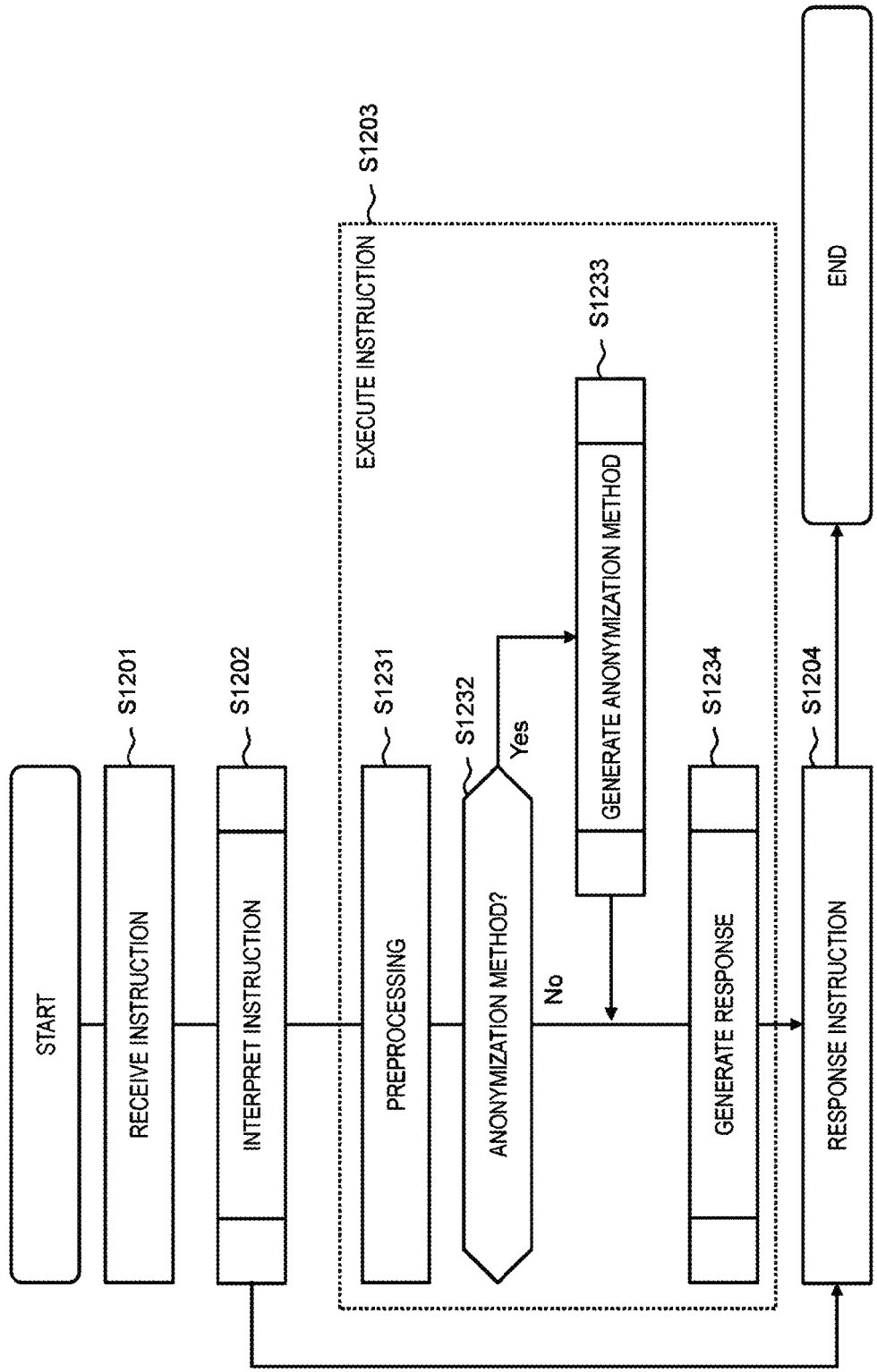
FIG. 12 is a diagram showing an example of a flow of entire processing performed by the DBMS.

FIG. 12 is a diagram showing an example of a flow of entire processing performed by the DBMS 140.

The instruction reception unit 141 receives an instruction from the client 110 (S1201).

The instruction interpretation unit 142 interprets the received instruction (S1202).

The instruction execution unit 143 executes the interpreted instruction (S1203). Specifically, the above execution is as follows.

The instruction execution unit 143 executes preprocessing (S1231). The preprocessing may be skipped depending on contents of the instruction. The "preprocessing" is preprocessing of the anonymization processing, and may be, for example, execution of generation of a query plan and processing according to the generated query plan. The preprocessing does not include the anonymization processing.

After the preprocessing, the instruction execution unit 143 determines whether to generate the anonymization method 154 (S1232). In the determination, a type of a received and interpreted instruction is determined. For example, as the instructions of "ANONYMIZE" or "CHECK ANONYMIZATION", when the instruction includes a description which means that generation of an anonymization method is necessary, a determination result of S1232 is true. On the other hand, when the instruction does not include a description which means that the generation of the anonymization method is necessary, the determination result of S1232 is false.

When the determination result of S1232 is true (S1232: Yes), the instruction execution unit 143 generates the anonymization method 154 (S1233).

When the determination result of S1232 is false (S1232: No), or after S1233, the instruction execution unit 143 generates a response (S1234).

After the instruction execution (S1203) as described above, the instruction response unit 144 returns a response (S1204).

An error response may be generated depending on a result of the instruction interpretation (S1202). In this case, the instruction execution (S1203) is skipped, and the instruction response unit 144 returns the generated error response.

Figure 13:
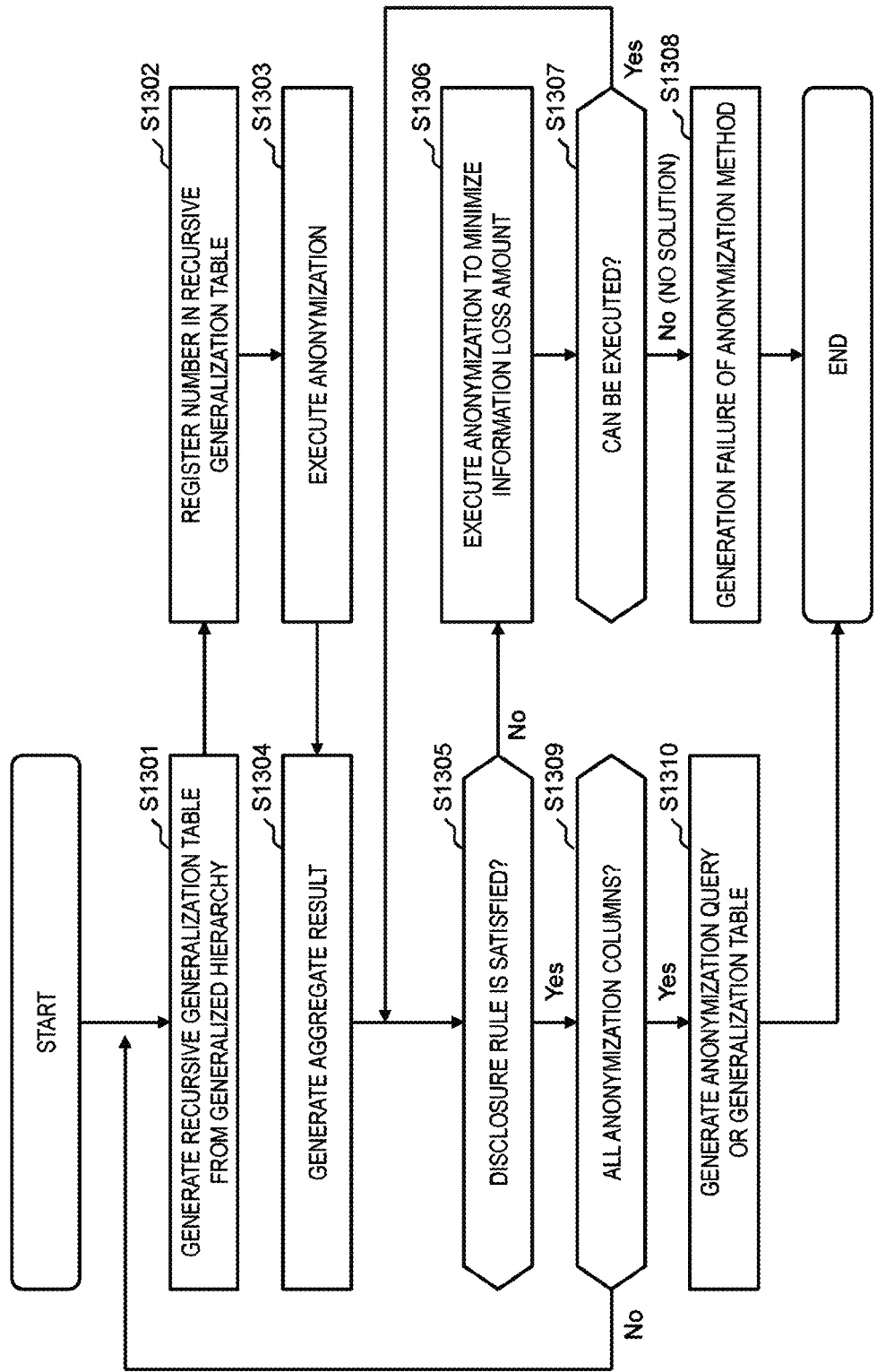
FIG. 13 is a diagram showing an example of details of generation (S1233 in FIG. 12) of the anonymization method.

FIG. 13 is a diagram showing an example of details of generation (S1233 in FIG. 12) of the anonymization method 154.

The anonymization method generation unit 161 is called from the execution control unit 170. The anonymization method generation unit 161 generates the recursive generalization table 203 of the anonymization column from the generalized hierarchy 153 of the anonymization column selected from one or a plurality of anonymization columns (S1301). In step S1301, for example, an NID is assigned to each node in the generalized hierarchy 153 according to a plurality of generalization rules (for example, Level 0 (1 year old for each increment), Level 1 (5 years old for each increment), and Level 2 (10 years old for each increment)) that correspond to the anonymization column. In S1301, the number is not registered in the recursive generalization table 203.

The anonymization method generation unit 161 extracts the anonymization column from the relation table 300 specified in the instruction, and, for each node, counts the number and registers the counted number in the recursive generalization table 203 based on the attribute value in the anonymization column.

The anonymization method generation unit 161 anonymizes the attribute value in the anonymization column using the generalization rules specified in the instruction, and updates the anonymization information for the node corresponding to the attribute value or an upper node thereof (S1303). For example, taking FIG. 7 as an example, when the generalization rules applied to the entire anonymization column "age" is Level 0, although the anonymization information corresponding to the end nodes is "1", the anonymization information corresponding to the parent nodes of the end nodes (for example, the node corresponding to Level 1) is "0".

The anonymization method generation unit 161 generates the aggregate result 652 from the temporary result 651 according to a result of S1303 (S1304). In S1304, at least a simple aggregate result 652S (see FIG. 16) to be described later is generated.

The anonymization method generation unit 161 determines whether the disclosure rule (value of k or value of l) is satisfied from the simple aggregate result 652S (S1305).

When the determination result of S1305 is false (S1305: No), the anonymization method generation unit 161 calculates an information amount related to a row that does not satisfy the disclosure rule, and executes anonymization to minimize the information loss amount (S1306). For example, it is assumed that there is a combined simple aggregate result to be described later based on a temporary result which is a combination of a plurality of the temporary results 651 each corresponding to a respective one of a plurality of anonymization columns. It is assumed that there are the column "age" and the column "ICD 10" as an example of the plurality of anonymization columns. When the value of k (or the value of l) is not satisfied for the combined simple aggregate result, further anonymization is executed by applying a generalization rule having a larger generalization degree that either the column "age" or the column "ICD 10". Here, it is assumed that, although the information loss amount is "10" if "age" is anonymized, the information loss amount is "100" if "ICD 10" is anonymized. In this case, anonymization of "age" can be executed. This is because the information loss amount is smaller if the "age" is anonymized.

The anonymization method generation unit 161 determines whether such anonymization can be executed (S1307). For example, when there is no generalization rule having a larger generalization degree, the determination result of S1307 is false (no solution).

When the determination result of S1307 is false (S1307: No), the anonymization method generation unit 161 sets a generation failure of the anonymization method (S1308). In this case, via S1401 in FIG. 14, the response that means the generation failure of the anonymization method is returned to the client 110 by the instruction response unit 144.

When the determination result of S1307 is true (S1307: Yes), S1305 is performed for information after S1306.

When the determination result of S1305 is true (S1305: Yes), the anonymization method generation unit 161 determines whether all anonymization columns have been inspected (whether steps after S1301 have been performed) (S1309). When the determination result of S1309 is false (S1309: No), S1301 is performed for another anonymization column. In such a manner, for each anonymization column, the recursive generalization table 203 is generated from the generalized hierarchy 153 of the anonymization column. In S1304, the temporary result 651 obtained by combining a plurality of anonymization columns is generated.

When the determination result of S1309 is true (S1309: Yes), the anonymization method generation unit 161 generates the anonymization query 201 or the generalization table 202 from the generated recursive generalization table 203.

Figure 14:
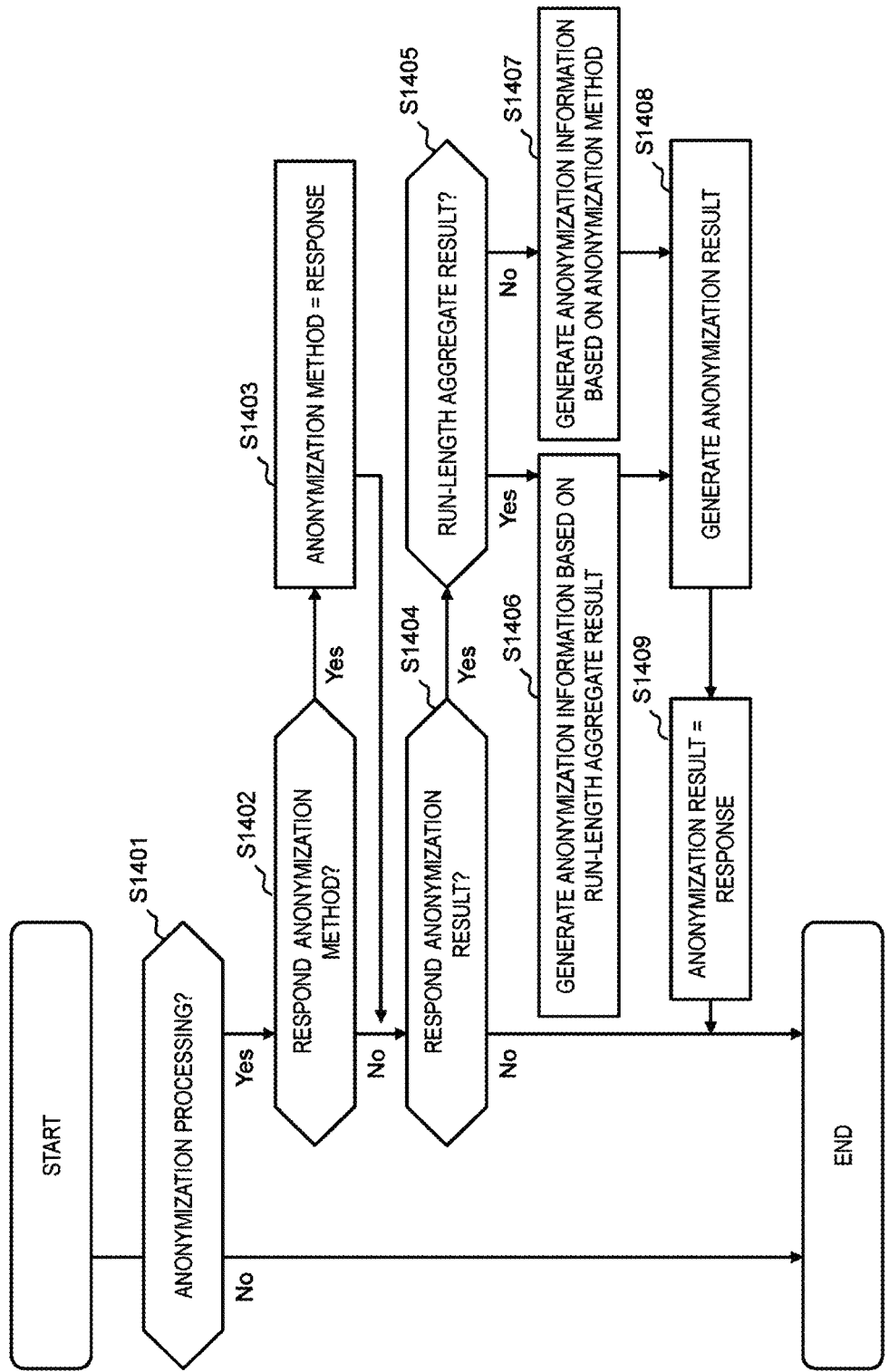
FIG. 14 is a diagram showing an example of details of response generation (S1234 in FIG. 12).

FIG. 14 is a diagram showing an example of details of a response generation (S1234 in FIG. 12).

The execution control unit 170 determines whether the anonymization processing is necessary (S1401). For example, when the anonymization method 154 is already generated or the instruction has the anonymization method 154 and it is necessary for the anonymization method 154 to be applied, a determination result of S1401 is true. On the other hand, for example, when the instruction is a query that does not require anonymization processing or when an error response is generated in the instruction interpretation (S1202 in FIG. 12), the determination result of S1401 is false. When the determination result of S1401 is false (S1401: No), the response generation ends. In this case, in S1204 in FIG. 12, the response returned by the instruction response unit 144 is an execution result of a query that does not require the anonymization processing, or an error response generated in the instruction interpretation.

When the determination result of S1401 is true (S1401: Yes), the execution control unit 170 determines whether to respond to the anonymization method 154 (S1402). For example, when the instruction is the instruction 1 in the instruction processing 2 (see FIG. 4) or an instruction 1501 to be described later with reference to FIG. 15, a determination result of S1402 is true.

When the determination result of S1402 is true (S1402: Yes), the execution control unit 170 calls the anonymization method generation unit 161, and the anonymization method generation unit 161 sets the anonymization method 154 generated in S1233 as a response (S1403).

When the determination result of S1402 is false (S1402: No), the execution control unit 170 determines whether to respond to the anonymization result 155 (S1404). For example, when the instruction is the instruction 1 in the instruction processing 1 (see FIG. 3) or an instruction 1601 to be described later with reference to FIG. 16, the determination result of S1404 is true.

When the determination result of S1404 is true (S1404: Yes), the execution control unit 170 calls the anonymization method application unit 162, and the anonymization method application unit 162 determines whether a run-length aggregate result is present (S1405).

When the determination result of S1405 is true (S1405: Yes), the anonymization method application unit 162 generates the anonymization information 660 based on the run-length aggregate result (S1406).

When the determination result of S1405 is false (S1405: No), the anonymization method application unit 162 generates the anonymization information 660 based on the anonymization method (S1407).

After S1406 or S1407, the anonymization method application unit 162 generates the anonymization result 155 from the generated anonymization information 660 based on the "OUTPUT TABLE" in the disclosure rule 152 (S1408). The anonymization method application unit 162 sets the generated anonymization result 155 as a response (S1409).

The response generated in the response generation described above includes at least one of the anonymization method 154 and the anonymization result 155. When the instruction source corresponds to an instruction source type that is restricted to the anonymization method 154 and/or the anonymization result 155 at the output authority indicated by the disclosure rule 152, the information to be a response may be adjusted in S1403 and/or S1408.

In the response generation described above, at least one of the following may be applicable.

When "DELETE (x)" is present, it is necessary to exclude rows that are less than values of k from the anonymization result 155 obtained by applying the anonymization method 154 to the relation table 300. When the value of "OUTPUT TABLE" is (y, on) in the disclosure rule 152 ("y" is an example of the above P value, and "on" is an example of the above Q value), it is necessary to adjust the anonymization result 155 excluding a (100−y) % row such that the anonymization result 155 does not fall below the value of k. In this case, an exclusion target is not determined unless the aggregation is executed.

On the other hand, when "DELETE (x)" is not present in the instruction and the value of "OUTPUT TABLE" is (y, off) in the disclosure rule 152, the information of (100−y) % is excluded from the anonymization result 155. The above indicates that the application of the anonymization method 154 to the response of the anonymization result 155 can be executed in a stream (temporary holding is unnecessary). In this case, a memory consumption amount and a calculation amount can be reduced, and thus response time to the client 110 can be shortened. Instead of or in addition to the description which means that the response of the anonymization method 154 is necessary for the instruction, the value of "OUTPUT TABLE" may be (y, off), which means that the response of the anonymization method 154 is unnecessary.

FIG. 15 is a diagram showing an example of a generation and response instruction of the anonymization method 154 and a response to the instruction.

The instruction 1501 is an example of the generation and response instruction of the anonymization method 154. The instruction 1501 includes a column specification 1511, a table specification 1512, a processing content specification 1513, and an anonymization column specification 1514, similarly to the instruction 601 shown in FIG. 6.

The instruction 1501 includes a description that means execution of a function of "CREATE STATIC VIEW" as a description which means that the instruction 1501 is the generation and response instruction of the anonymization method 154. A "STATIC" of the description means generation of the anonymization method 154 based on the relation table 300 (the relation table 300 specified in the table specification 1512) at the present time (a time point when the instruction is received). The above is because, if a row is deleted from the relation table 300 after the generation of the anonymization method 154, even if the value of k (or value of l) is satisfied at a time of the generation of the anonymization method 154, the value of k (or value of l) may not be satisfied after the deletion of the row.

When the anonymization method 154 has been generated in response to the instruction 1501, a response 1502S is returned. The response 1502 has a description "SUCCESS" that means a generation success, and specifically, the generated anonymization method 154 is associated with at least the generalization table 202, for example. That is, the generated anonymization method 154 is transmitted to a transmitting destination of the response 1502.

When the anonymization method 154 is not generated in response to the instruction 1501, a response 1502F is returned. The response 1502F has a description "FAILURE" that means a generation failure.

In the present embodiment, the response of the anonymization method 154 may be any of the following.

The response includes the anonymization method 154 itself. In this case, an anonymization management view (see FIG. 24) to be described later may be displayed by a computer program (for example, an application program that communicates with the DBMS 140) executed in a terminal such as the client 110 that receives the response, or a link between the program and the DBMS 140. In this case, the instruction 2 (see FIG. 4) has the anonymization method 154 itself.

The anonymization method 154 itself is stored in the storage device 130 accessible by the DBMS 140, and the response includes information for specifying the anonymization method 154 (for example, an ID assigned to the anonymization method 154). In this case, the instruction reception unit 141 may receive an instruction for displaying an anonymization management view, which will be described later, and the instruction execution unit 143 may provide an anonymization management view to the instruction source in response to the instruction. In this case, the instruction 2 (see FIG. 4) has information for specifying the anonymization method 154.

Figure 16:
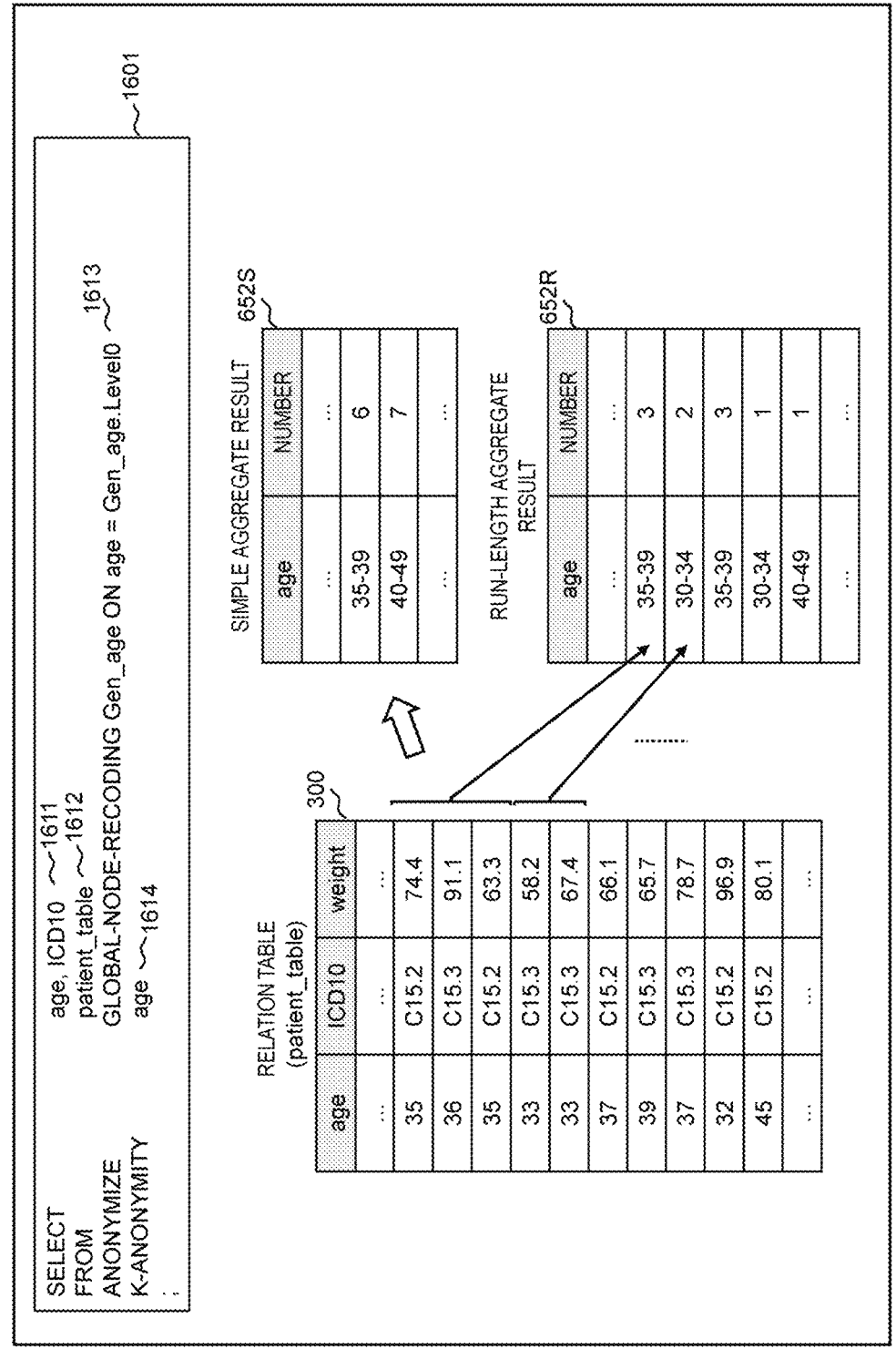
FIG. 16 is a diagram showing an example of an instruction of the anonymization processing and an example of a simple aggregate result and a run-length aggregate result that are generated in the anonymization processing in response to the instruction.

FIG. 16 is a diagram showing an example of an instruction of the anonymization processing and an example of a simple aggregate result and a run-length aggregate result that are generated in the anonymization processing according to the instruction.

An instruction 1601 is an example of an instruction for the anonymization processing. The instruction 1601 includes a column specification 1611, a table specification 1612, a processing content specification 1613, and an anonymization column specification 1614, similarly to the instruction 601 shown in FIG. 6.

By comparing the column specification 1611 and the anonymization column specification 1614, it is known that the anonymization column is a column "age" and a non-anonymization column is the column "ICD 10". The above is because, out of the column "age" and the column "ICD 10" that are specified in the column specification 1611, a column specified in the anonymization column specification 1614 is only the column "age".

The aggregate result 652 generated in the execution of the instruction 1601 includes the simple aggregate result 652S and a run-length aggregate result 652R.

The simple aggregate result 652S is information indicating the number of each generalized value. According to the simple aggregate result 652S, since the anonymization column "age" is simply aggregated and the number is counted for each generalized value, an order relation of the rows in the column "age" is broken. Therefore, it is impossible for the simple aggregate result 652S to combine with other columns (which may be any of the anonymization column and the non-anonymization column). As a result, it is necessary to scan all anonymization columns and non-anonymization columns again. However, since it is impossible to determine whether the value of k is satisfied from the run-length aggregate result 652R to be described later, it is necessary to generate the simple aggregate result 652S.

On the other hand, as shown in the drawing, the run-length aggregate result 652R is information (run-length compression information) as a result of the aggregation in which the order of the rows in the anonymization column "age" is maintained. Therefore, it is possible for the run-length aggregate result 652R to combine with other columns. That is, the anonymization result 155 can be generated by scanning only the non-anonymization columns after the anonymization. If the run-length aggregate result 652R is generated, a compression effect can be enhanced by sorting the anonymization columns. However, in a column direction, since a load of the combining processing increases when the sorting is performed, it is preferable to use the sorting only in a row direction.

Figure 17:
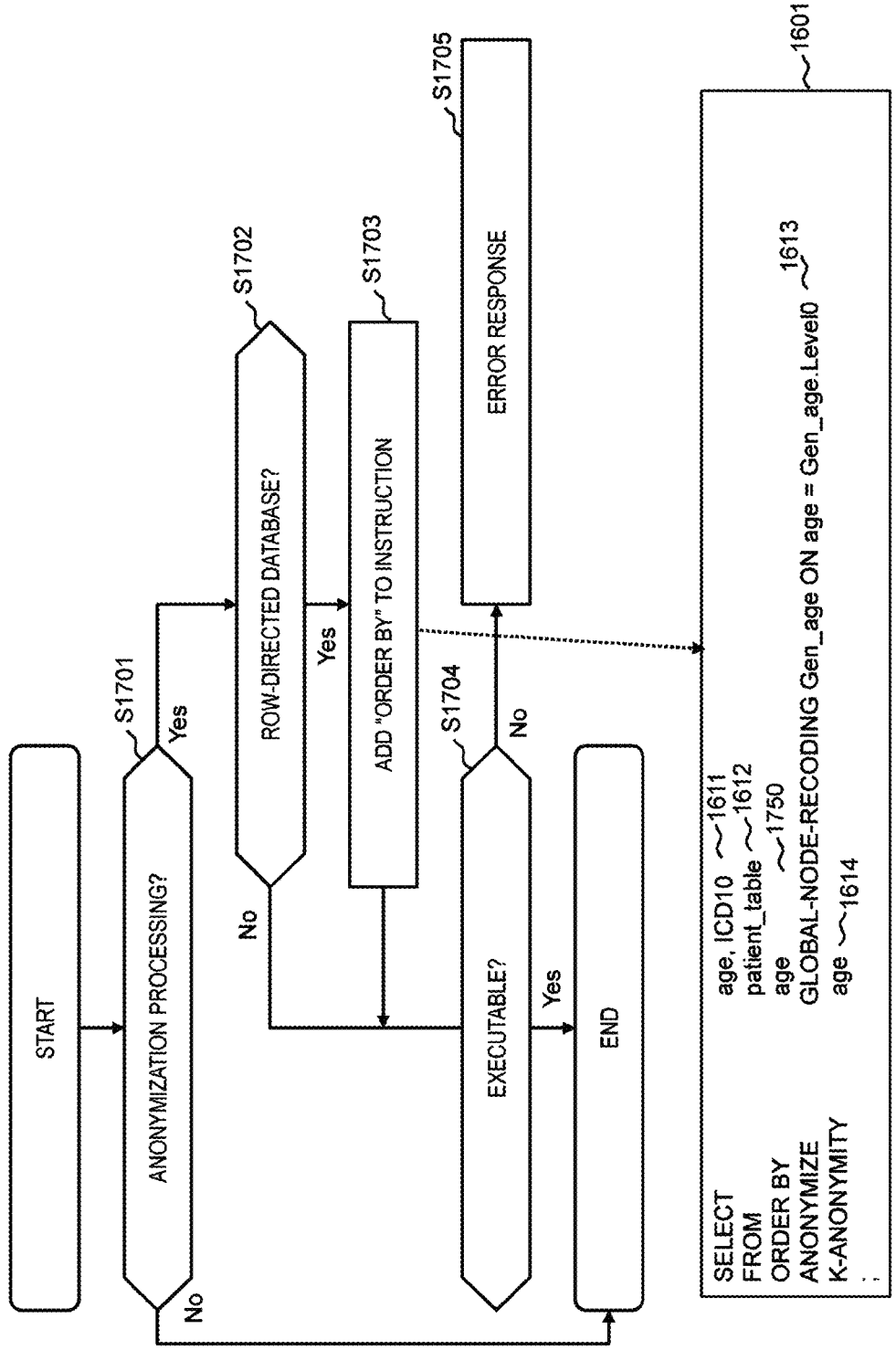
FIG. 17 is a diagram showing an example of details of instruction interpretation (S1202 in FIG. 12).

FIG. 17 is a diagram showing an example of details of instruction interpretation (S1202 in FIG. 12).

The instruction interpretation unit 142 determines whether the instruction is an instruction that requires the anonymization processing (S1701). When the determination result of S1701 is false (S1701: No), the instruction interpretation is ended.

When the determination result of S1701 is true (S1701: Yes), the instruction interpretation unit 142 determines whether the relation table specified by the instruction is a row-directed database (S1702). When the determination result of S1702 is true (S1702: Yes), the instruction interpretation unit 142 adds "ORDER BY" to the instruction (S1703). In the row direction, column combinations are not generated since extraction is executed in a unit of one row. Therefore, sort can be executed, so that it is possible to enhance a run-length compression effect in run-length aggregation. A target (that is, a target of sorting) of "ORDER BY" is the anonymization column. For example, in the case of the instruction 1601 exemplified in FIG. 16, "ORDER BY" 1750, whose target is the anonymization column "age", is added to the instruction 1601. When there are a plurality of anonymization columns, in order to increase compression efficiency, sorting is desirably performed in order from a column having a low cardinality. For example, when the column "age" and a column "sex" are present as the anonymization columns, gender "sex" is sorted first.

When the determination result of S1702 is false (S1702: No) or after S1703, the instruction interpretation unit 142 refers to the disclosure rule 152 to determine whether an instruction can be executed (S1704). By the determination in S1704, the anonymization processing can be prevented from being executed even though the output cannot be executed. For example, for the instruction source, if the value of "SELECT" is "no" in the disclosure rule 152, the relation table 300 cannot be referred to, and thus the anonymization method 154 and the anonymization result 155 cannot be generated. Therefore, the determination result of S1704 is false.

When the determination result of S1704 is false (S1704: No), the instruction interpretation unit 142 generates an error response which means that the instruction is not executable (S1705). In this case, in S1204 in FIG. 12, the error response is returned by the instruction response unit 144.

Figure 18:
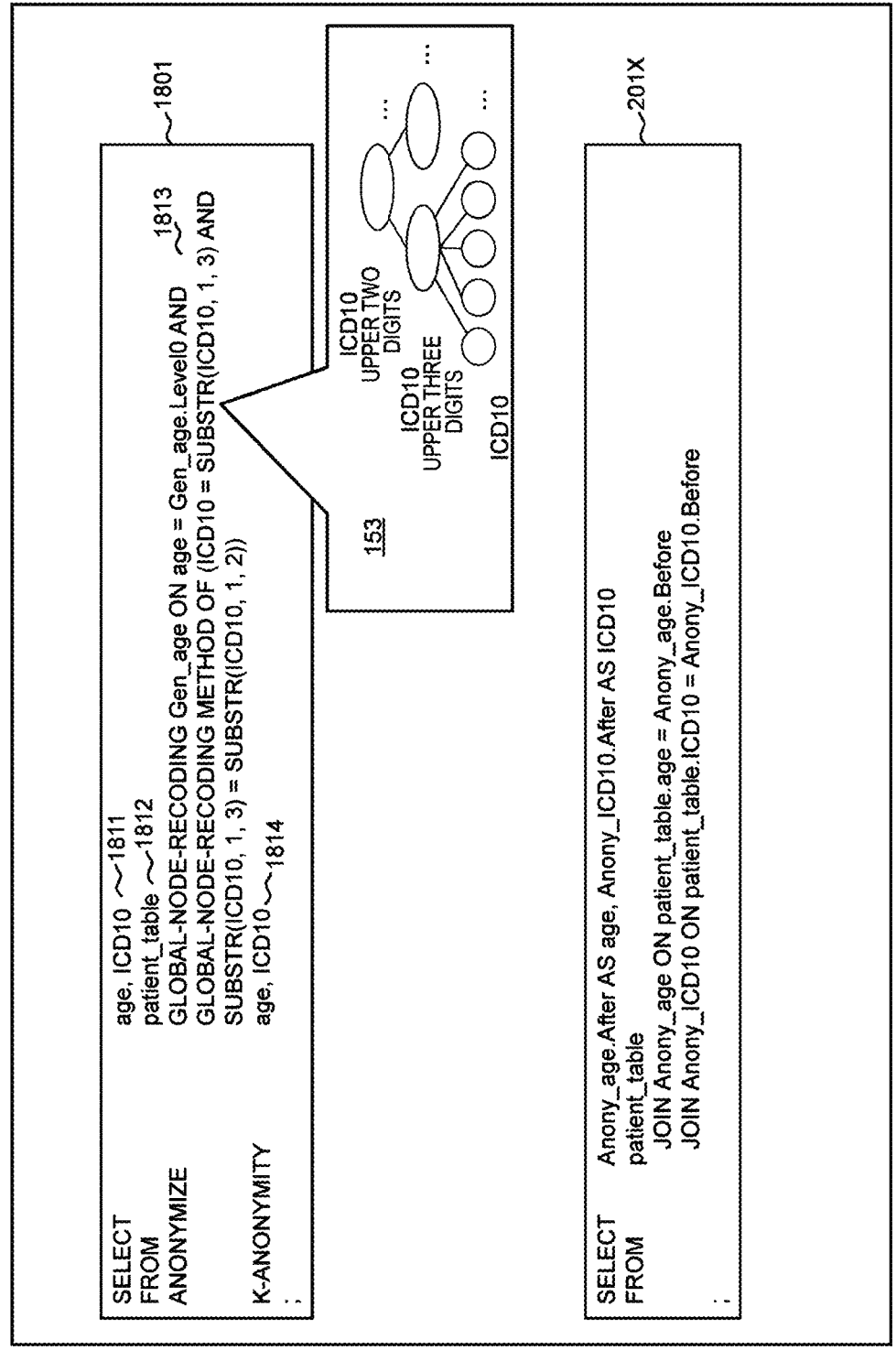
FIG. 18 is a diagram showing an example of an instruction for the anonymization processing and an example of an anonymization query for the anonymization processing.

FIG. 18 is a diagram showing an example of an instruction for the anonymization processing and an example of an anonymization query for the anonymization processing.

An instruction 1801 is an example of an instruction for the anonymization processing. The instruction 1801 includes a column specification 1811, a table specification 1812, a processing content specification 1813, and an anonymization column specification 1814, similarly to the instruction 601 shown in FIG. 6.

By comparing the column specification 1811 and the anonymization column specification 1814, it is known that the anonymization columns are columns "age" and "ICD 10", and no non-anonymization column is present. The above is because the columns "age" and "ICD 10" are specified in both the column specification 1811 and the anonymization column specification 1814.

In the processing content specification 1813, "(ICD 10=SUBSTR (ICD 10, 1, 3) AND SUBSTR (ICD 10, 1, 3)=SUBSTR (ICD 10, 1, 2))" is a description of the generalized hierarchy 153 corresponding to the column "ICD". The tree structure according to the generalized hierarchy 153 represented by the description is as exemplified in FIG. 18. That is, the attribute value (for example "C15.2") of column "ICD 10" is the end node, upper three digits (for example, "C15") of the attribute value are the parent nodes of the end node, and upper two digits (for example, "C1") of the attribute value are further parent nodes. In such a manner, an expression form of the generalized hierarchy 153 is not limited.

An example of an anonymization query for the anonymization processing according to the instruction 1801 is an anonymization query 201X.

Figure 19:
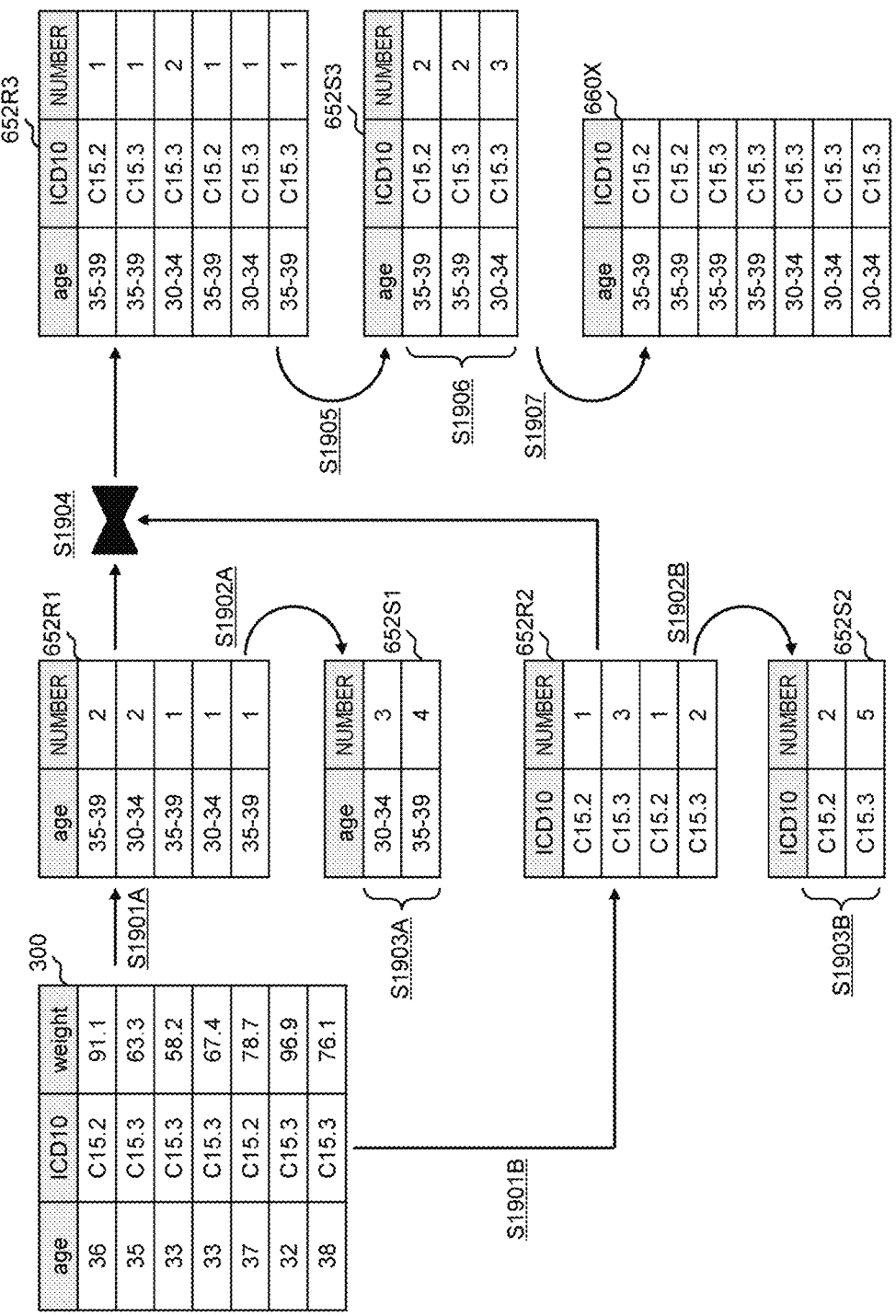
FIG. 19 is a diagram showing an example of generation of an aggregate result in the anonymization processing in response to the instruction exemplified in FIG. 18.

FIG. 19 is a diagram showing an example of generation of an aggregate result 652 in the anonymization processing in response to the instruction 1801.

For each of the anonymization column "age" and the column "ICD 10" in the relation table 300, the anonymization method generation unit 161 generates the run-length aggregate result 652R (S1901), generates the simple aggregate result 652S (S1902), and determines whether the value of k (or value of 1) are satisfied (S1903). Specifically, the processing is as follows. The value of k is set to 2.

The anonymization method generation unit 161 generates a run-length aggregate result 652R1 from the anonymization column "age" in the relation table 300 (S1901A), and generates a simple aggregate result 652S1 from the run-length aggregate result 652R1 (S1902A). The anonymization method generation unit 161 determines whether all the rows (generalized values) satisfy the value of k from the simple aggregate result 652S1. According to the shown example, since the number of each row is 2 (value of k) or more, the value of k is satisfied.

The anonymization method generation unit 161 generates a run-length aggregate result 652R2 from the anonymization column "ICD 10" in the relation table 300 (S1901B), and generates a simple aggregate result 652S2 from the run-length aggregate result 652R2 (S1902B). The anonymization method generation unit 161 determines whether all the rows satisfy the value of k from the simple aggregate result 652S2. According to the shown example, since the number of each row is 2 (value of k) or more, the value of k is satisfied.

If the value of k is satisfied for each anonymization column, the anonymization method generation unit 161 generates a combined run-length aggregate result 652R3 in which the run-length aggregate results 652R1 and 652R2 are combined (S1904). The anonymization method generation unit 161 generates a combined simple aggregate result 652S3 from the combined run-length aggregate result 652R3 (S1905), and determines whether all the rows satisfy the value of k from the combined simple aggregate result 652S3 (S1906). According to the shown example, since the number of each row is 2 (value of k) or more, the value of k is satisfied.

The anonymization method application unit 162 applies the anonymization method 154 based on such a combined simple aggregate result 652S3 to the anonymization columns "age" and "ICD 10" of the relation table 300 to obtain anonymization information 660X exemplified in FIG. 19. The anonymization information 660X is a combination of the column "age" after the anonymization and the column "ICD 10" after the anonymization.

Figure 20:
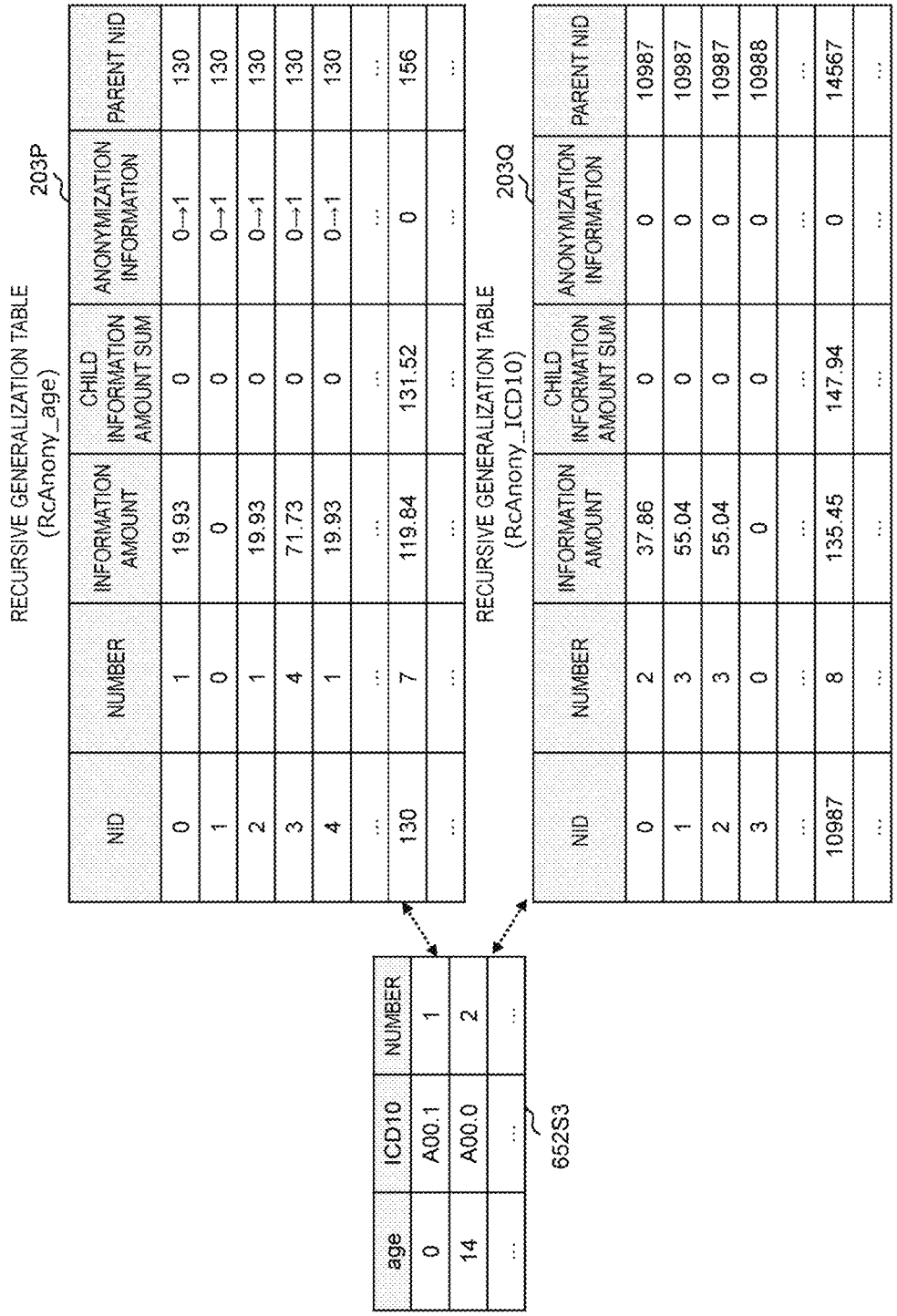
FIG. 20 is a diagram showing an example of selection of a column for further anonymization in the anonymization processing in response to the instruction exemplified in FIG. 18.

FIG. 20 is a diagram showing an example of selection of a column for further anonymization in the anonymization processing in response to the instruction 1801.

In the description with reference to FIG. 19, if any of the rows of the combined simple aggregate result 652S3 does not satisfy the value of k, anonymization of at least one of the column "age" and the column "ICD 10" is necessary for any of the rows of the combined simple aggregate result 652S3 to satisfy the value of k. In this case, as described in S1306 in FIG. 13, columns having a smaller information loss amount are anonymized. Specifically, for example, the processing is as follows.

(2000-1) The anonymization method generation unit 161 searches the combined simple aggregate result 652S3 for the rows (the number is less than values of k) that require anonymization.

(2000-2) The anonymization method generation unit 161 refers to a recursive generalization table 203P (the recursive generalization table 203 named "RcAnony_age") corresponding to the column "age" and a recursive generalization table 203Q (the recursive generalization table 203 named "RcAnony_ICD10") corresponding to the column "ICD 10". (In FIG. 20, the illustration of the column "level" is omitted.)

(2000-3) The anonymization method generation unit 161 calculates an information loss amount for the column "age".

Specifically, for the parent node (NID=130) of the node to which the attribute value of the row found in (2000-1) belongs, the anonymization method generation unit 161 calculates that child information amount sum "131.52"–information amount "119.84"=information loss amount "11.68".

(2000-4) The anonymization method generation unit 161 calculates an information loss amount for the column "ICD 10". Specifically, for the parent node (NID=10987) of the node to which the attribute value of the row found in (2000-1) belongs, the anonymization method generation unit 161 calculates that child information amount sum "147.94"–information amount "135.45"=information loss amount "12.49".

(2000-5) The anonymization method generation unit 161 compares the information loss amount "11.68" for the column "age" and the information loss amount "12.49" for the column "ICD 10". Since the information loss amount is small for the column "age", the anonymization method generation unit 161 changes the anonymization information from "0" to "1" for all the lower nodes (NID=0 to NID=4 in the shown example) of the parent node (NID=130) corresponding to the information loss amount "11.68" for the column "age".

When the anonymization information is set for the node to which the attribute value of the row found in (2000-1) belongs, the processing of setting the anonymization information corresponding to the node is skipped.

FIG. 21 is a diagram showing an example of an instruction for the anonymization processing and an example of an anonymization query for the anonymization processing.

An instruction 2101 is an example of an instruction for the anonymization processing. The instruction 2101 includes a column specification 2111, a table specification 2112, a processing content specification 2113, and an anonymization column specification 2114, similarly to the instruction 601 shown in FIG. 6.

By comparing the column specification 2111 and the anonymization column specification 2114, it is known that the anonymization columns are columns "age", "sex", "ICD 10" and "weight", and no non-anonymization column is present. The above is because the columns "age", "sex", "ICD 10" and "weight" are specified in both the column specification 2111 and the anonymization column specification 2114.

An example of an anonymization query for the anonymization processing according to the instruction 2101 is an anonymization query 201Y.

In the anonymization processing in response to the instruction 2101, a combination (for example, a combination of the run-length aggregate results) of a plurality of columns occurs. In the present embodiment, as a combination of a plurality of columns, either a balance tree or a left deep is adopted, and calculation order of a plurality of columns is determined. Which of the balance tree and the left deep is adopted may be specified (explicited) in the instruction 2101 or the anonymization query 201Y, may be predefined in the database management 156 (see FIG. 1), or may be automatically selected by the anonymization method generation unit 161 based on a calculation load status and a memory availability status (for example, if a calculation load is low and a free memory is large, the balance tree may be selected, and if the calculation load is high and the free memory is small, the left deep may be selected).

Figure 22:
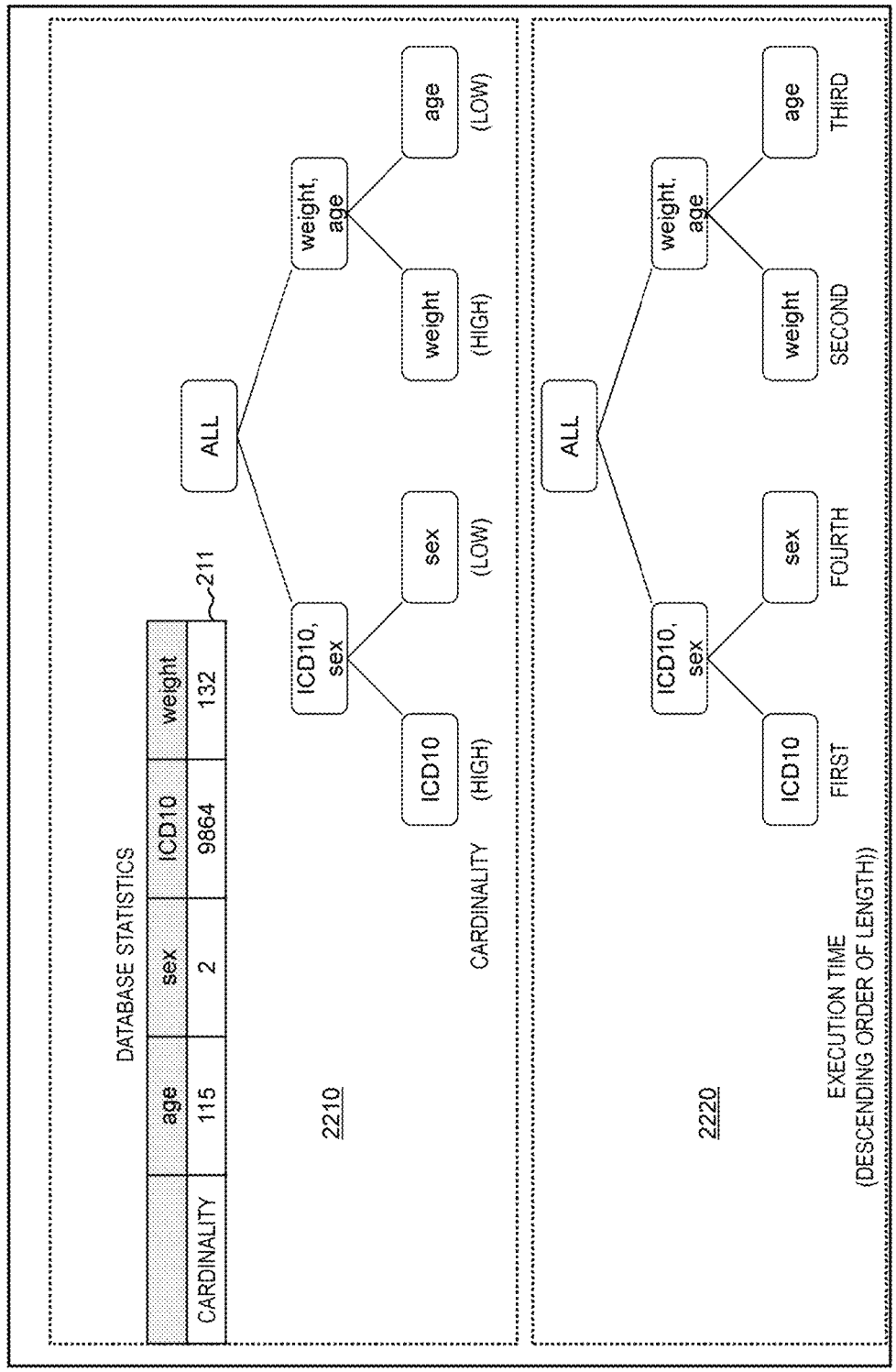
FIG. 22 is a diagram showing an example of a column combination according to a balance tree.

FIG. 22 is a diagram showing an example of the column combination according to the balance tree.

In the column combination according to the balance tree, any of a random approach, a cardinality approach, and an execution time approach is adopted.

In the random approach, the anonymization method generation unit 161 randomly selects anonymization columns to be combined, and combines the selected anonymization columns.

Here, depending on cost of each anonymization column to be combined, the number of combinations of values may increase, and a calculation amount of the value of k (or value of l) may increase.

Therefore, it is preferable to adopt a cost based approach. Types of the cost based approach include a cardinality approach 2210 and an execution time approach 2220.

In the cardinality approach 2210, the cardinality of each column is specified from the database statistics 211. The database statistics 211 include numerical values representing cardinality for each column in the relation table 300. The anonymization method generation unit 161 specifies the cardinality of each anonymization column by referring to the database statistics 211. For each of one or more column combinations, the anonymization method generation unit 161 combines an anonymization column having a high cardinality and an anonymization column having a low cardinality. In this case, the higher a cardinality of the anonymization column, the lower a cardinality of an anonymization column combined with the anonymization column is. Accordingly, the speed-up of parallel processing accompanying load distribution (balance) can be achieved.

In the execution time approach 2220, execution time required for the anonymization of the anonymization column is calculated. A column having a longer execution time is a combination target of a column having a shorter execution time.

Figure 23:
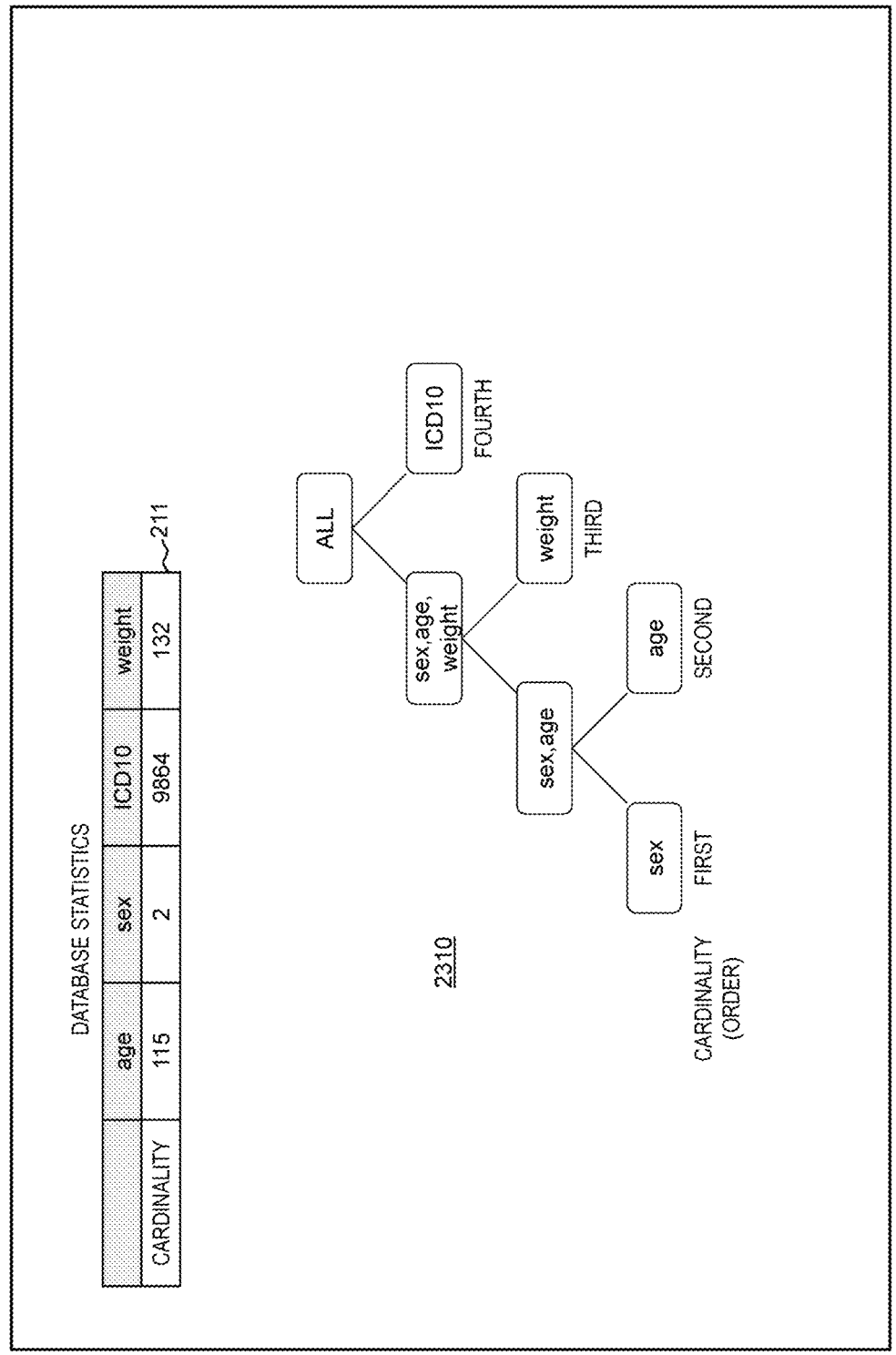
FIG. 23 is a diagram showing an example of a column combination according to a left deep.

FIG. 23 is a diagram showing an example of a column combination according to the left deep.

In the column combination according to the left deep, either a random approach or a cardinality approach is adopted. For the reasons described above, it is preferred to adopt a cardinality approach.

In the left deep cardinality approach 2310, the low cardinality is valid for the run-length aggregate result 652R. This is because if the cardinality is low, the number of rows is more likely to be small, and as a result, a search range at a time of the combining processing is small and a memory consumption amount is small. The anonymization method generation unit 161 specifies the cardinality of each anonymization column by referring to the database statistics 211. The anonymization method generation unit 161 selects anonymization columns in ascending order of cardinality, and combines the selected anonymization columns. That is, the column anonymization processing is executed in ascending order of cardinality.

Figure 24:
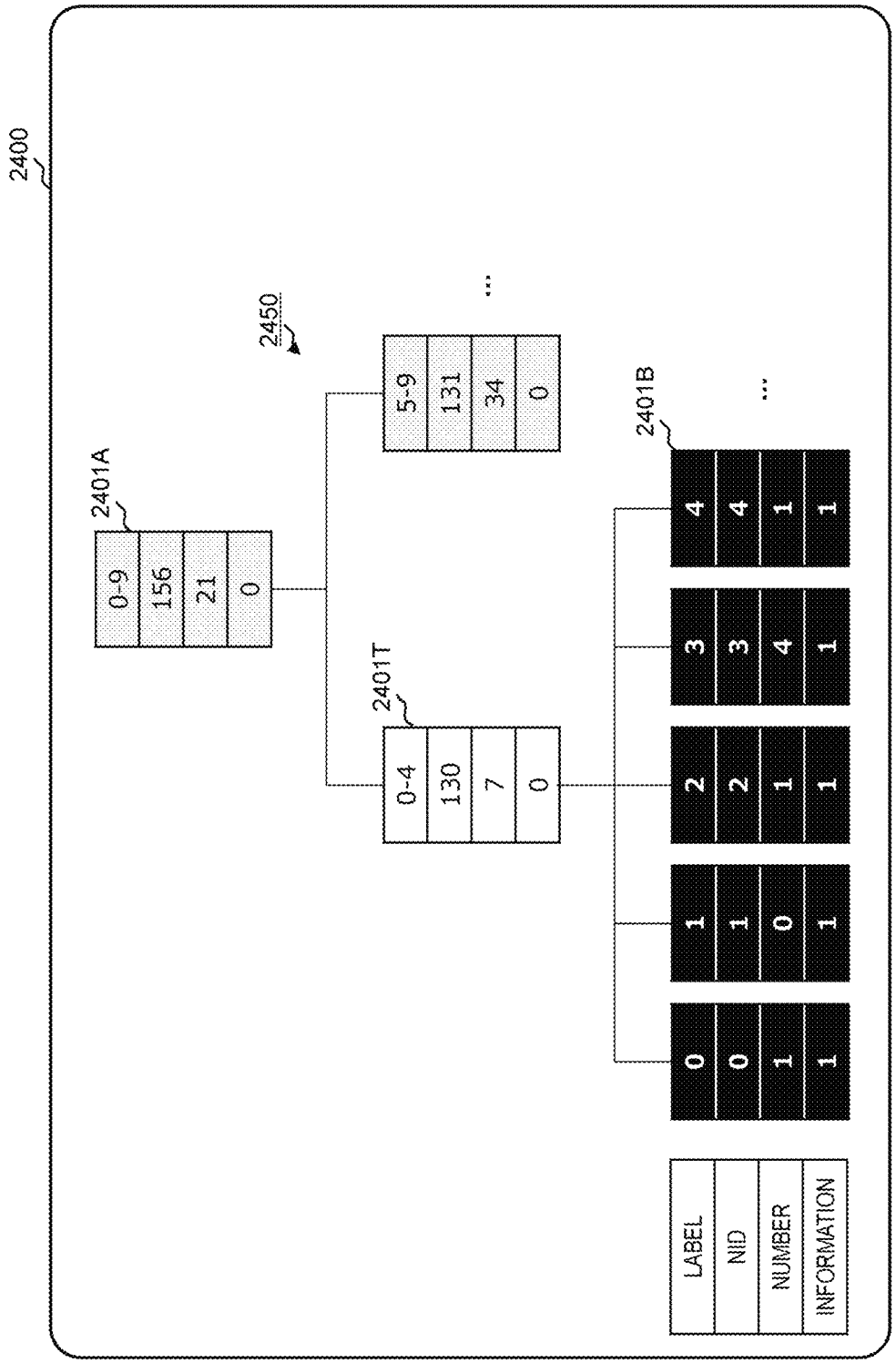
FIG. 24 is a diagram showing an example of an anonymization management view.

FIG. 24 is a diagram showing an example of an anonymization management view.

An anonymization management view 2400 is, for example, a graphical user interface (GUI), and is a visualization of the recursive generalization table 203. For example, the anonymization management view 2400 is displayed based on the recursive generalization table 203 when the recursive generalization table 203 is included in the anonymization method 154 in response to the instruction.

The anonymization management view 2400 exemplified in FIG. 24 is a view based on the recursive generalization table 203 corresponding to the anonymization column "age". The anonymization management view 2400 represents the relationship of nodes in a tree structure. Specifically, for example, the anonymization management view 2400 displays a recursive generalization tree 2450. In the recursive generalization tree 2450, each block 2401 corresponds to a node. The block 2401 includes, for example, a plurality of cells arranged in the column direction. Each of the plurality of cells corresponds to a respective one of a plurality of items "label", "NID", "number", and "information" (anonymization information). A value in the cell is a value for an item corresponding to the cell.

In the recursive generalization tree 2450, a block 2401B displayed in black is a block corresponding to a node to which an anonymized attribute value (a label) belongs. A block 2401T displayed in white is a block corresponding to a node to which a generalized value (a label) satisfying the value of k (or value of l) as a result of the anonymization belongs. A block 2401A displayed in gray is a block corresponding to an upper node of the node corresponding to the block 2401T, or a block corresponding to a child node of the upper node.

The anonymization management view 2400 exemplified in FIG. 24 is an example of a view when the entire recursive generalization table 203 is included in the anonymization method 154 because an output of the entire recursive generalization table 203 is permitted in "OUTPUT ANONYMIZATION" of the disclosure rule 152. When the output of apart of the recursive generalization table 203 is inhibited in "OUTPUT ANONYMIZATION", since the recursive generalization table 203 included in the anonymization method 154 does not have a part of information, the display of the recursive generalization tree 2450 is different from the display exemplified in FIG. 24. For example, when the output of the node corresponding to the anonymized attribute value is inhibited, the block 2401B is not present. For example, when the output of the "number" is inhibited, in each block 2401, no cell corresponding to the "number" is present.

With the anonymization management view 2400, it is easy for the administrator or the user to understand the configuration of the recursive generalization table 203.

Although one embodiment has been described above, this is an exemplification for describing the invention, and the scope of the invention is not intended to be limited to this embodiment. The invention can be implemented in various other forms.

The above description can be summarized as follows. The following summary may include matters not described in the above description.

What is claimed is:

1. A database management system configured to manage a database that stores a relation table, the database management system comprising:
   at least one processor which, when executing at least one program, configures the at least one processor to:
   receive one or more instructions including a first instruction specifying a first generalization rule corresponding to a first generalization degree which corresponds to a first column of the relation table, among anonymization rule information that is present for each column included in the relation table and shows a generalization rule for each generalization degree;
   execute each of the one or more instructions;
   respond with an execution result of each of the one or more instructions;
   read a first column from the relation table in response to the first instruction;

generate, for the first column, recursive generalization information that manages the attribute values of the first column and the generalized attribute values for each generalization degree of the first generalization rule;

generate a first temporary result obtained by generalizing each of the attribute values of the first column based on the first generalization rule corresponding to the first generalization degree;

generate a first aggregate result obtained by aggregating the first temporary result;

generate, based on the recursive generalization information, a first anonymization method including generalization information indicating a correspondence relationship of each of the attribute values of the first column and the generalized attribute value generalized based on the first generalization rule corresponding to the first generalization degree when the first aggregate result satisfies a disclosure rule indicated by disclosure rule information;

respond with information indicating the first anonymization method;

generate a first temporary result that is generalized based on a generalization rule corresponding to a higher generalization degree than the first generalization degree for all or some attribute values of the first temporary result when the first aggregate result does not satisfy a disclosure rule indicated by disclosure rule information;

generate first anonymization information as a result of processing the relation table based on the first anonymization method in response to the first instruction or a second instruction; and respond with a first anonymization result that is all or a part of the first anonymization information.

2. The database management system according to claim 1, wherein the at least one processor is further configured to:

after the first anonymization method is generated, respond with the first anonymization method as a response to the first instruction;

receive the second instruction including the first anonymization method; and generate the first anonymization result in response to the second instruction.

3. The database management system according to claim 1, wherein in any of a plurality of generalization rules included in the first anonymization rule information, when the first aggregate result does not satisfy the disclosure rule information, the at least one processor is further configured to respond to the first instruction information that there is no anonymization method that satisfies the disclosure rule information as a response.

4. The database management system according to claim 1, wherein the at least one processor is further configured to:

manage an anonymization method history indicating a generation date and time of the first anonymization method and a relation table history indicating a final execution date and time of deletion of operations on the relation table; and prevent execution of the first anonymization method when the generation date and time of the first anonymization method is before the final execution date and time.

5. The database management system according to claim 1, wherein the disclosure rule information includes information indicating at least output authority out of reference authority and the output authority in the relation table.

6. The database management system according to claim 5, wherein in the disclosure rule information, the information indicating the output authority includes information indicating a part of the first anonymization method from which output is inhibited.

7. The database management system according to claim 5, wherein in the disclosure rule information, in a case where the information indicating the reference authority or the output authority includes information indicating inhibition of referring to the first column, or information indicating inhibition of outputting the first anonymization method and the first anonymization result, no execution in response to the first instruction or the second instruction is executed, and the at least one processor is further configured to return an error response.

8. The database management system according to claim 1, wherein the recursive generalization information indicates a distribution of the attribute values in the first column.

9. The database management system according to claim 8, wherein for the first column, the recursive generalization information includes, for each of the attribute values that is to be acquired relating to the first column, the number of the attribute value, another attribute value that is to be acquired relating to the first column to which the attribute value belongs, and whether to execute anonymization.

10. The database management system according to claim 9, wherein the at least one processor is further configured to:

provide an anonymization management view that visualizes the recursive generalization information; and indicate a relationship of attribute values that are to be obtained relating to the first column.

11. The database management system according to claim 10, wherein the disclosure rule information includes information indicating output authority in the relation table, the information indicating the output authority includes information indicating a part of the recursive generalization information from which output is inhibited, and the information displayed by the anonymization management view depends on information indicating the output authority.

12. The database management system according to claim 1, wherein each of two or more columns including the first column among the plurality of columns constituting the relation table is a column to be anonymized, and the at least one processor is further configured to:

generate, for each of the two or more columns, a run-length aggregate result, which is an aggregate result having the number of generalized attribute values obtained by anonymizing sequentially from a head attribute value of the column; and generate an anonymization method based on the two or more run-length aggregate results each corresponding to a respective one of the two or more columns.

13. The database management system according to claim 12, wherein the at least one processor is further configured to:

execute a column combination based on a cardinality of each of the two or more columns.

14. The database management system according to claim 13, wherein the at least one processor is further configured to:

select to execute a column combination in either manner of a balance tree or a left deep based on a calculation load status and a memory availability status.

15. A database management method for managing a database that stores a relation table, the database management method comprising:

receiving one or more instructions including a first instruction specifying a first generalization rule corresponding to a first generalization degree which corresponds to a first column of the relation table, among anonymization rule information that is present for each column included in the relation table and shows a generalization rule for each generalization degree;

reading a first column from the relation table in response to the first instruction;

generating, for the first column, recursive generalization information that manages the attribute values of the first column and the generalized attribute values for each generalization degree of the first generalization rule;

generating a first temporary result obtained by generalizing each of the attribute values of the first column based on the first generalization rule corresponding to the first generalization degree;

generating a first aggregate result obtained by aggregating the first temporary result;

generating, based on the recursive generalization information, a first anonymization method including generalization information indicating a correspondence relationship of each of the attribute values of the first column and the generalized attribute value generalized based on the first generalization rule corresponding to the first generalization degree when the first aggregate result satisfies a disclosure rule indicated by disclosure rule information;

responding with information indicating the first anonymization method;

generating a first temporary result that is generalized based on a generalization rule corresponding to a higher generalization degree than the first generalization degree for all or some attribute values of the first temporary result when the first aggregate result does not satisfy a disclosure rule indicated by disclosure rule information;

generating first anonymization information as a result of processing the relation table based on the first anonymization method in response to the first instruction or a second instruction; and responding with a first anonymization result that is all or a part of the first anonymization information.

* * * * *